(12) United States Patent
Ikuta et al.

(10) Patent No.: US 11,088,591 B2
(45) Date of Patent: Aug. 10, 2021

(54) MOTOR AND ACTUATOR

(71) Applicant: Minebea Mitsumi Inc., Nagano (JP)

(72) Inventors: Akiko Ikuta, Fukuroi (JP); Masaki Ogushi, Nara (JP)

(73) Assignee: MINEBEA MITSUMI INC., Nagano (JP)

( * ) Notice: Subject to any disclaimer, the term of this patent is extended or adjusted under 35 U.S.C. 154(b) by 134 days.

(21) Appl. No.: 15/918,445

(22) Filed: Mar. 12, 2018

(65) Prior Publication Data
US 2018/0269747 A1    Sep. 20, 2018

(30) Foreign Application Priority Data

Mar. 15, 2017    (JP) .............................. JP2017-049807

(51) Int. Cl.
| | | |
|---|---|---|
| *H02K 5/24* | (2006.01) | |
| *H02K 1/17* | (2006.01) | |
| *H02K 23/40* | (2006.01) | |
| *H02K 1/18* | (2006.01) | |

(52) U.S. Cl.
CPC ................. *H02K 5/24* (2013.01); *H02K 1/17* (2013.01); *H02K 1/185* (2013.01); *H02K 23/40* (2013.01); *H02K 23/405* (2013.01)

(58) Field of Classification Search
CPC .......... H02K 23/04; H02K 1/17; H02K 23/40; H02K 5/24; H02K 23/405; H02K 1/18; H02K 1/185
USPC ...................................... 310/154, 51, 431, 89
See application file for complete search history.

(56) References Cited

U.S. PATENT DOCUMENTS

| | | | |
|---|---|---|---|
| 2008/0030095 A1 | 2/2008 | Iizuka et al. | |
| 2010/0033036 A1 | 2/2010 | Ortt et al. | |
| 2010/0156203 A1* | 6/2010 | Nemoto ................... | H02K 1/17 310/43 |
| 2011/0121667 A1* | 5/2011 | Mori ........................ | H02K 5/24 310/51 |
| 2013/0106219 A1* | 5/2013 | Schneider ................ | H02K 5/22 310/89 |

FOREIGN PATENT DOCUMENTS

| | | |
|---|---|---|
| CN | 101682218 A | 3/2010 |
| CN | 102075026 A | 5/2011 |
| JP | 53-87806 U | 7/1978 |
| JP | 04-028759 U1 | 3/1992 |
| JP | 2008-043031 A | 2/2008 |
| JP | 2010-148209 A | 7/2010 |
| JP | 2010148209 A * | 7/2010 |

(Continued)

OTHER PUBLICATIONS

JP-2010259197-A (English Translation) (Year: 2010).*

(Continued)

*Primary Examiner* — Quyen P Leung
*Assistant Examiner* — Alexander Moraza
(74) *Attorney, Agent, or Firm* — Pearne & Gordon LLP

(57) ABSTRACT

A motor comprising a frame and one or a plurality of magnets disposed inside the frame, wherein a gap extending in a circumferential direction is provided between an inner peripheral surface of the frame and an outer peripheral surface of the magnet, and the magnet and the frame arranged at both sides of the gap are coupled together in a rotational shaft direction by means of an adhesive.

18 Claims, 17 Drawing Sheets

(56) References Cited

FOREIGN PATENT DOCUMENTS

| JP | 2010259197 A | * | 11/2010 | | |
|---|---|---|---|---|---|
| JP | 2011-109885 A | | 6/2011 | | |
| JP | 2013-093998 A | | 5/2013 | | |
| JP | 2013093998 A | * | 5/2013 | | |
| WO | WO-2008052929 A1 | * | 5/2008 | ............... | H02K 1/17 |

OTHER PUBLICATIONS

JP-2010148209-A (English Translation) (Year: 2010).*
WO-2008052929-A1 (English Translation) (Year: 2008).*
JP-2013093998-A (English Translation) (Year: 2013).*
Japanese Office Action dated Aug. 18, 2020 for corresponding Japanese Application No. 2017-049807 and English translation.
Chinese Office Action dated Dec. 1, 2020 for corresponding Chinese Application No. 201810173475.9 and English translation.

* cited by examiner

MOTOR AND ACTUATOR

CROSS REFERENCE TO RELATED APPLICATIONS

This application claims the benefit of Japanese Patent Application No. 2017-049807, filed Mar. 15, 2017, which is hereby incorporated by reference in its entirety.

BACKGROUND

Technical Field

The present disclosure relates to a motor and an actuator, and more particularly, to a motor with a magnet attached inside a frame, and an actuator.

Background

Some motors used for an actuator or the like have a structure with a magnet attached inside a frame.

Japanese Utility model Application Laid-Open No. H4-28759 discloses a structure of a DC motor provided with a permanent magnet in surface contact with an inner surface of a motor housing. In this DC motor, a buffer having elasticity is interposed in laminated form in the surface contact between the motor housing and the permanent magnet.

The above-described motor is required to have less weight.

The present disclosure is related to providing a motor and an actuator having less weight.

SUMMARY

In accordance with one aspect of the present disclosure, a motor includes a frame, and one or a plurality of magnets disposed inside the frame. A gap extending in a circumferential direction is provided between an inner peripheral surface of the frame and an outer peripheral surface of the magnet, and the magnet and the frame arranged at both sides of the gap are coupled together in a rotational shaft direction with an adhesive.

Preferably, the frame includes a plurality of corner parts and a surface part arranged between two neighboring corner parts, and magnetic pole elements of the one or the plurality of magnet are disposed at the plurality of corner parts.

Preferably, the magnet includes an annular shape and includes the plurality of magnetic pole elements.

Preferably, the plurality of magnets are disposed at the plurality of corner parts respectively, and the plurality of magnets include the magnetic pole elements respectively.

Preferably, the frame includes a reinforcing member or a rib, and the reinforcing member or the rib extends in a radial direction and extends in a circumferential direction.

Preferably, the frame includes a plurality of corner parts and a surface part arranged between two neighboring corner parts, a reinforcing member or a rib is provided at the surface part, and the reinforcing member or the rib extends in a radial direction and extends in the circumferential direction.

Preferably, an end portion of the reinforcing member or the rib is provided at one of the two neighboring corner parts.

Preferably, the reinforcing member is formed with a member different from the member of the frame.

Preferably, the rib is formed with a recessed portion or a protruding portion of the frame.

Preferably, the motor is provided with a bracket, the bracket includes an outer peripheral surface having a closed annular shape and an inner peripheral surface of the frame is in contact with an outer peripheral surface of the bracket.

Preferably, the bracket includes a tubular portion having an opening through which a rotational shaft passes and the tubular portion includes an outer peripheral surface.

Preferably, the outer peripheral surface of the bracket extends toward the magnet in the rotational shaft direction.

Preferably, the frame includes a plurality of corner parts and a surface part arranged between two neighboring corner parts, and the outer peripheral surface of the bracket facing the surface part of the frame has rigidity in a radial direction.

In accordance with another aspect of the present disclosure, an actuator includes the above-described motor, and a housing including an accommodating part for the motor, the accommodating part includes a plurality of corner parts and a surface part arranged between two neighboring corner parts, a reinforcing member or a rib is provided at a surface part of the accommodating part, and the reinforcing member or the rib extends in a radial direction of the motor.

Preferably, the frame includes a plurality of corner parts and a surface part arranged between two neighboring corner parts, and the reinforcing member or the rib urges the surface part of the frame toward inside of the motor.

Preferably, an end portion of the reinforcing member or the rib is provided at one of the two neighboring corner parts of the accommodating part.

Preferably, the reinforcing member is formed with a member different from the member of the housing.

Preferably, the rib is formed with a protruding portion or formed between a plurality of recessed portions of the housing.

In accordance with these disclosures, it is possible to provide a motor and an actuator having less weight.

DETAILED DESCRIPTION

Hereinafter, an example of a motor and an actuator using the motor according to an embodiment of the present disclosure will be described with reference to the accompanying drawings.

In the following description, a direction parallel to the shaft of the motor may be referred to as a "rotational shaft direction." Furthermore, the rotational shaft direction may be referred to as an "upward/downward direction" (the direction in which the shaft projects when seen from the frame of the motor is an upward direction). The "upward/downward," "upward," "downward" and the like referred to here are expressions adopted for convenience when attention is focused on the motor only and these expressions are by no means intended to restrict the direction of a device at which the motor is mounted or a posture in which the motor is used.

Embodiments

Figure 1:
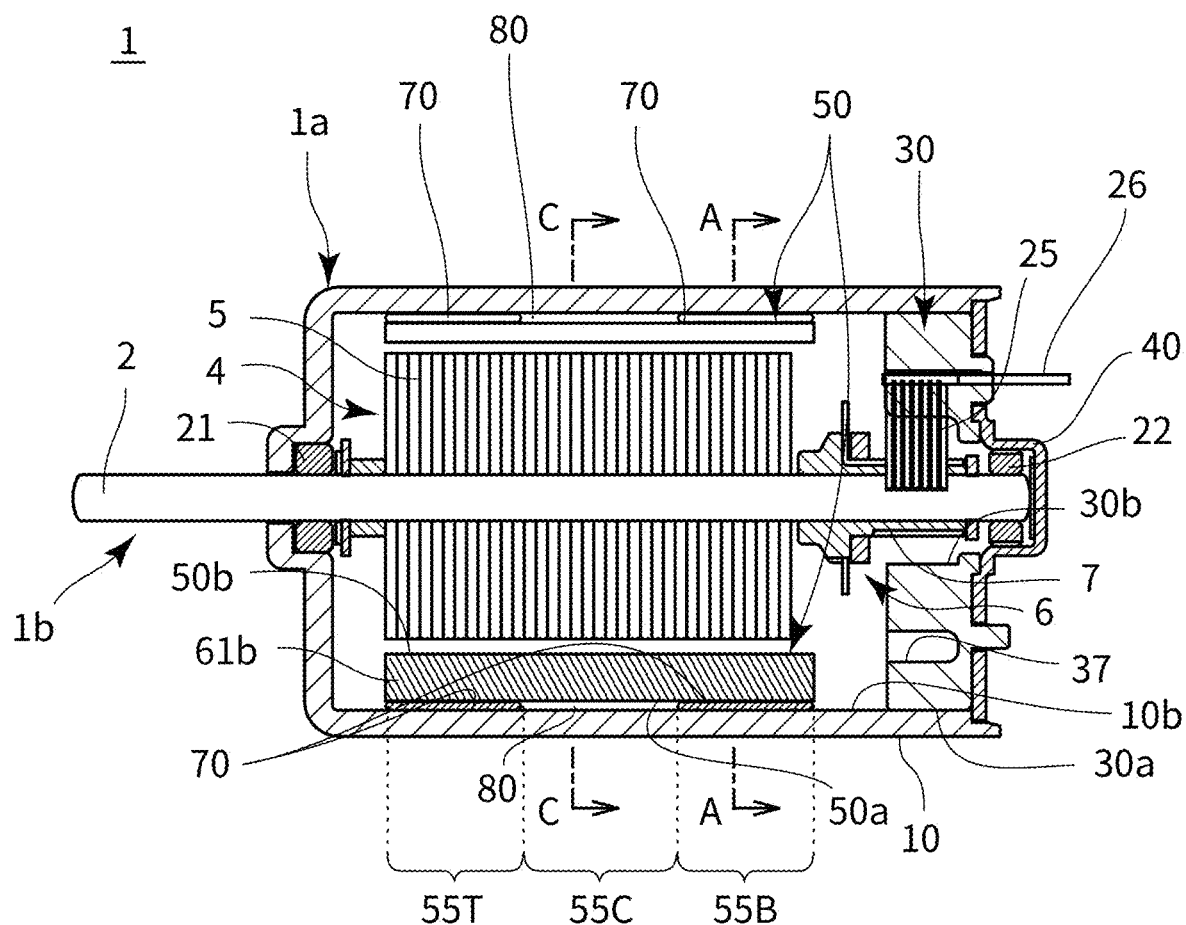
FIG. 1 is a cross-sectional view illustrating a motor according to one embodiment of the present disclosure.

FIG. 1 is a cross-sectional view illustrating a motor 1 according to one embodiment of the present disclosure.

The cross section shown in FIG. 1 is a cross section along a line shown as a line B-B in FIG. 2 to be described later. In the drawings hereinafter, an arrow A1 represents a rotational shaft direction. In the arrow A1, the direction indicated by an arrowhead represents an upward direction.

The motor 1 is, for example, a DC motor. Roughly speaking, the motor 1 includes a frame assembly 1a and an armature assembly 1b rotatable with respect to the frame assembly 1a.

The armature assembly 1b includes a rotational shaft (shaft) 2, an armature part 4, and a commutator part 6 or the like. The armature part 4 is attached to the rotational shaft 2. The armature part 4 includes an armature core 5 having a plurality of projecting poles projecting in a radial direction and a winding (not shown) wound around each projecting pole or the like. The commutator part 6 is provided in the vicinity of one end portion of the rotational shaft 2. As described later, the commutator part 6 includes a brush 25 provided at the frame assembly 1a and a commutator 7 in contact with the brush 25 or the like.

The frame assembly 1a is formed with a frame (motor case) 10, a bracket 30, a plate 40, a magnet 50 or the like.

The frame 10 is provided with a top end portion and a lower end portion and has a tubular shape with the top end portion covered with a surface. That is, the frame 10 has a cup shape and the lower end portion of the frame 10 forms an opening. The opening at the lower end portion of the frame 10 (right end portion in FIG. 1) is covered by the plate 40. The armature assembly 1b is accommodated in the housing formed with the frame 10 and the plate 40.

The bracket 30 is attached to an inside of the plate 40. The bracket 30 holds a terminal 26. An electric current from the outside is supplied to the terminal 26. The terminal 26 is connected to the brush 25. The brush 25 is held so as to contact the commutator 7.

The rotational shaft 2 penetrates the top surface of the frame 10. That is, the top end portion of the rotational shaft 2 projects outward from the frame 10 and the other part of the rotational shaft 2 is accommodated. A bearing 21 is held to a central part of the upper surface of the frame 10. A bearing 22 is held to a central part of the plate 40. The rotational shaft 2 is rotatably supported to the frame 10 with the two bearings 21 and 22.

Figure 2:
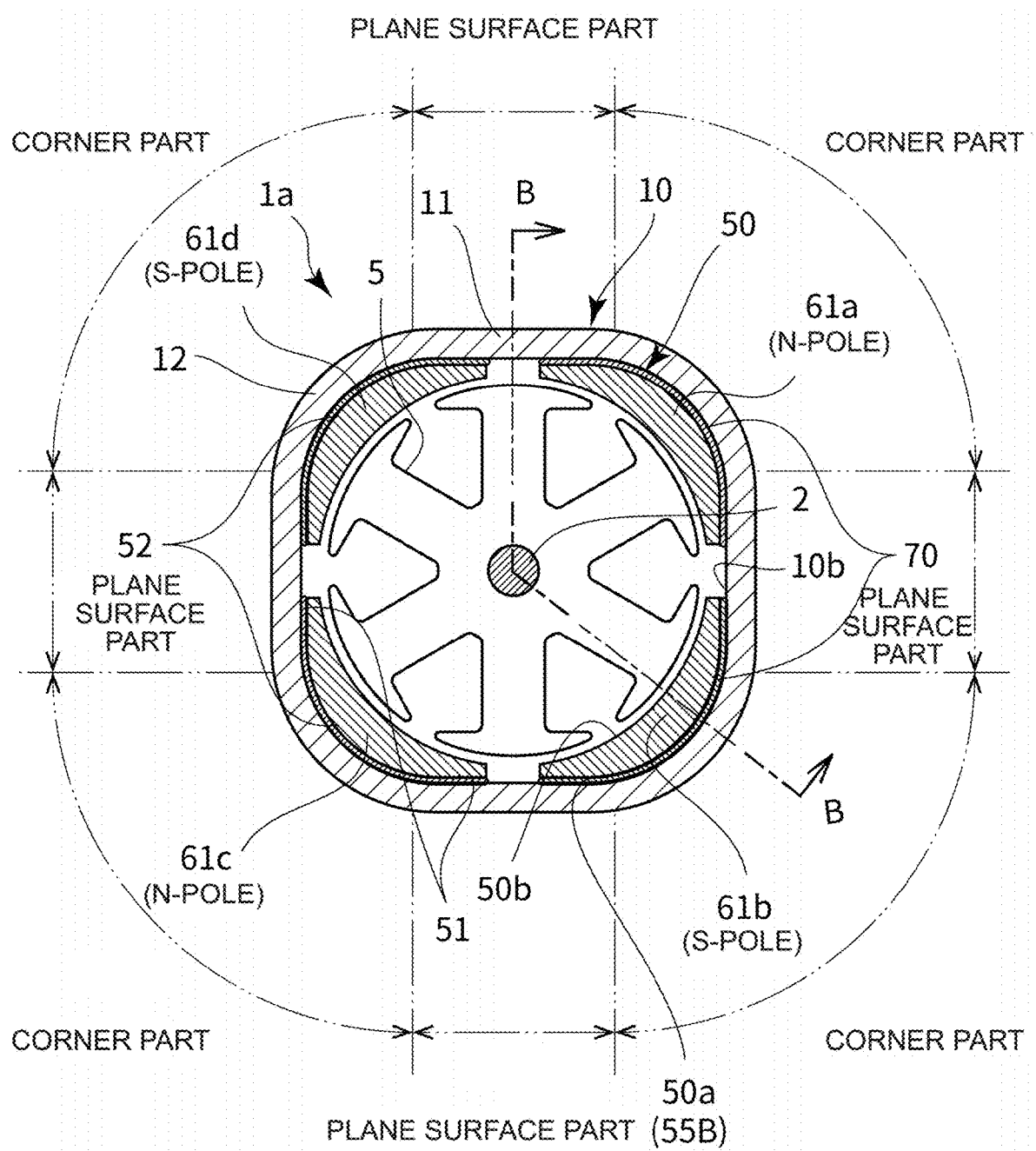
FIG. 2 is a cross-sectional view along a line A-A in FIG. 1.

FIG. 2 is a cross-sectional view along a line A-A in FIG. 1.

As shown in FIG. 2, one set of four magnets 50 is provided in the present embodiment. Each magnet 50 is disposed inside the frame 10. The frame assembly 1a has a cross-sectional structure in which an outer peripheral surface 50a of each magnet 50 is surrounded by the frame 10. The outer peripheral surface of the frame 10 is the outer peripheral surface of the motor 1.

The frame 10 is formed using a magnetic material. The frame 10 includes a plurality of corner parts 12 and a plane surface part (an example of the surface part) 11 arranged between two neighboring corner parts 12. More specifically, the frame 10 has an outer shape having four plane surface parts 11 and four corner parts 12. The two plane surface parts 11 neighboring in the circumferential direction are connected together via one corner part 12. One of the two plane surface parts 11 neighboring in the circumferential direction is substantially perpendicular to another plane surface part. The corner part 12 has a rounded shape (R shape). The frame 10 has a substantially square shape in a cross section perpendicular to the rotational shaft 2. The frame 10 is formed into a shape having a plurality of corners as a whole.

The frame 10 has a substantially uniform thickness. That is, an inner peripheral surface 10b of the frame 10 is configured such that a plurality of plane parts of the plane surface parts 11 and a plurality of rounded parts of the corner parts 12 are connected together, and is formed into a shape having a plurality of corners.

The magnet 50 is a couple magnet formed using, for example, a publicly known rare earth material and a publicly known resin material. Note that the magnet 50 is not limited to the couple magnet, but may be a sintering-type magnet.

The four magnets 50 each have a magnetic pole element 61 (N-pole 61a, S-pole 61b, N-pole 61c, S-pole 61d). That is, the four magnets have the same number of the magnetic pole elements 61 as the corner parts 12 of the motor 1. The magnetic pole elements 61 are disposed in the circumferential direction such that the polarity alternates. The four magnets 50 are arranged in such a state in which the magnetic pole elements 61 are placed opposite to each other in the four corner parts 12 of the frame 10. That is, when seen as one set of the magnets 50, switching parts of the four magnetic pole elements 61 are arranged so as to overlap the plane surface part 11 of the frame 10 in the radial direction.

The four magnets 50 each have the outer peripheral surface 50a having a rounded shape that follows the inner peripheral surface 10b of the frame 10 of the corner part 12. The four magnets 50 each have an inner peripheral surface 50b of a tubular shape. A tiny air gap is provided between the inner peripheral surface 50b of each magnet 50 and the armature core 5. Each of the four magnets 50 is disposed in the circumferential direction such that a gap is provided between the neighboring magnets 50. That is, in the frame assembly 1a, the inner peripheral surface 10b of part of each plane surface part 11 is exposed toward the armature assembly 1b. Since the magnet 50 is disposed, the inner peripheral surface 10b of the other part of each plane surface part 11 is covered with the magnet 50. In this way, a substantially whole circumference of the armature core 5 is covered with the columnar surface formed with the inner peripheral surfaces 50b of the four magnets 50 except the parts where the inner peripheral surface 10b of the frame 10 is exposed.

In the present embodiment, the magnet 50 is coupled to the inner peripheral surface 10b of the frame 10 using an adhesive 70. That is, the adhesive 70 is interposed between the outer peripheral surface 50a of the magnet 50 and the inner peripheral surface 10b of the frame 10.

Figure 3:
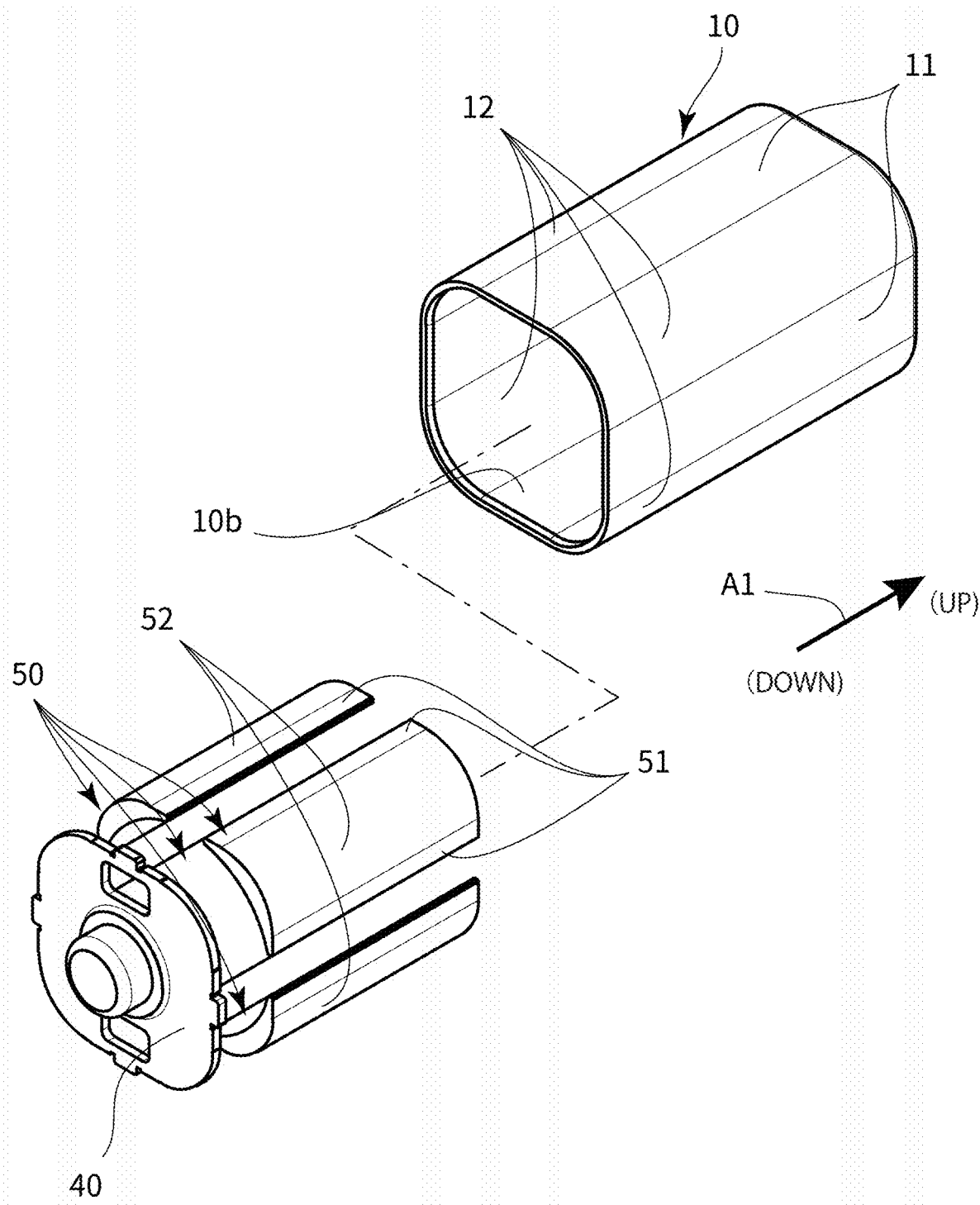
FIG. 3 is an exploded perspective view of a frame assembly.

FIG. 3 is an exploded perspective view of the frame assembly 1a.

FIG. 3 omits the illustration of the bracket 30.

As shown in FIG. 3, the four magnets 50 are accommodated inside the frame 10 through the opening at the bottom of the frame 10 and coupled to the inner peripheral surface 10b of the frame 10. After that, the motor 1 is assembled by housing the armature assembly 1b inside the frame 10 and attaching the bracket 30 and the plate 40 to the frame 10.

Figure 4:
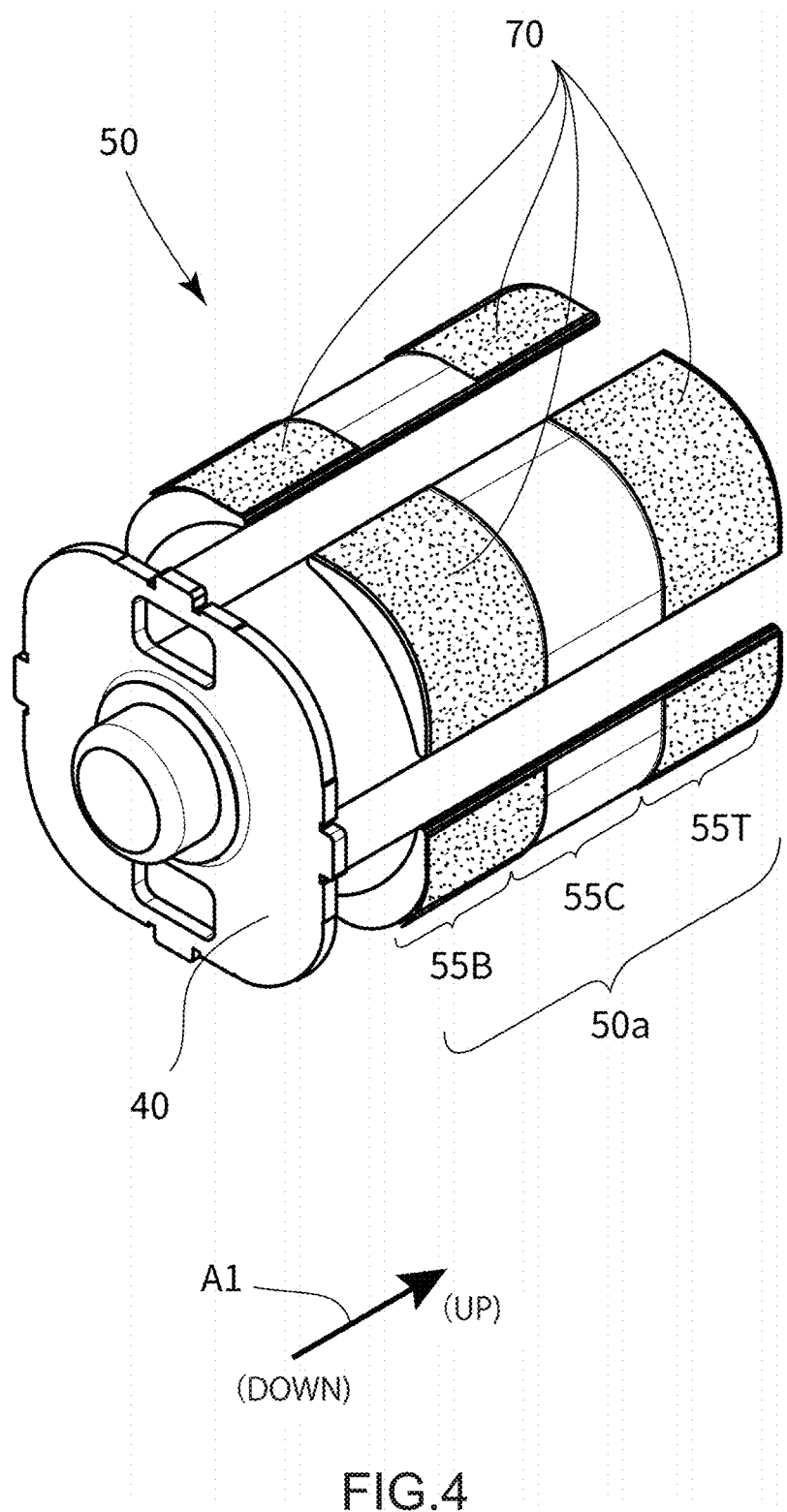
FIG. 4 is a diagram describing a region of a magnet where an adhesive is disposed.

FIG. 4 is a diagram illustrating a region of the magnet 50 where the adhesive 70 is disposed.

The adhesive 70 is formed with a publicly known resin material and disposed at the outer peripheral surface 50a of each magnet 50 using a method such as application. The adhesive 70 is disposed over not the whole but part of the region of the outer peripheral surface 50a of each magnet 50. More specifically, it is, for example, over the following region of the outer peripheral surface 50a that the adhesive 70 is disposed.

As shown in FIG. 4, a case is assumed where the outer peripheral surface 50a is divided into three regions in the rotational shaft direction (top outer peripheral surface 55T, central outer peripheral surface 55C and bottom outer peripheral surface 55B). The top outer peripheral surface 55T is a region corresponding to a top ⅓ part of the outer peripheral surface 50a. The bottom outer peripheral surface 55B is a region corresponding to a bottom ⅓ part of the outer peripheral surface 50a. The central outer peripheral surface 55C is a region corresponding to the remaining ⅓ part between the top outer peripheral surface 55T and the bottom outer peripheral surface 55B. In the present embodiment, the adhesive 70 is disposed over the two regions of the top outer peripheral surface 55T and the bottom outer peripheral surface 55B. The adhesive 70 is not disposed over the central outer peripheral surface 55C. That is, the adhesive 70 is disposed over the top and bottom regions in the rotational shaft direction, whereas the adhesive 70 is not disposed over the central region in the rotational shaft direction. The adhesive 70 is disposed over two regions not adjacent to each other of the three regions divided in the rotational shaft direction forming the outer peripheral surface 50a.

As shown in FIG. 1, the adhesive 70 is disposed over part of the region of the outer peripheral surface 50a of the magnet 50 in this way, and a gap 80 is provided between the inner peripheral surface 10b of the frame 10 and the outer peripheral surface 50a of the magnet 50. The adhesive 70 coupling the magnet 50 to the frame 10 is disposed at both sides of the gap 80 in the rotational shaft direction. In other words, the adhesive 70 causes the magnet 50 and the frame 10 arranged at both sides of the gap 80 to be connected together.

More specifically, the gap 80 is provided between the central outer peripheral surface 55C and the inner peripheral surface 10b of the frame 10. The gap 80 extends in the circumferential direction. The adhesive 70 is arranged above the gap 80. That is, the adhesive 70 is sandwiched between the top outer peripheral surface 55T and the inner peripheral surface 10b of the frame 10. The adhesive 70 is arranged below the gap 80. That is, the adhesive 70 is sandwiched between the bottom outer peripheral surface 55B and the inner peripheral surface 10b of the frame 10.

Note that depending on a coupling situation between the magnet 50 and the frame 10, an interval between the inner peripheral surface 10b of the frame 10 and the outer peripheral surface 50a of the magnet 50 may subtly differ between the respective positions. For such a reason, the adhesive 70 applied to the top outer peripheral surface 55T or the bottom outer peripheral surface 55B may stick out upward or downward or the region of the gap 80 may slightly expand. The ratio among the respective regions 55T, 55C and 55B is not limited to ⅓ each, but any one region may be wider or narrower. The ratio among the respective regions 55T, 55C and 55B may be ¼:2/4:¼.

Figure 5:
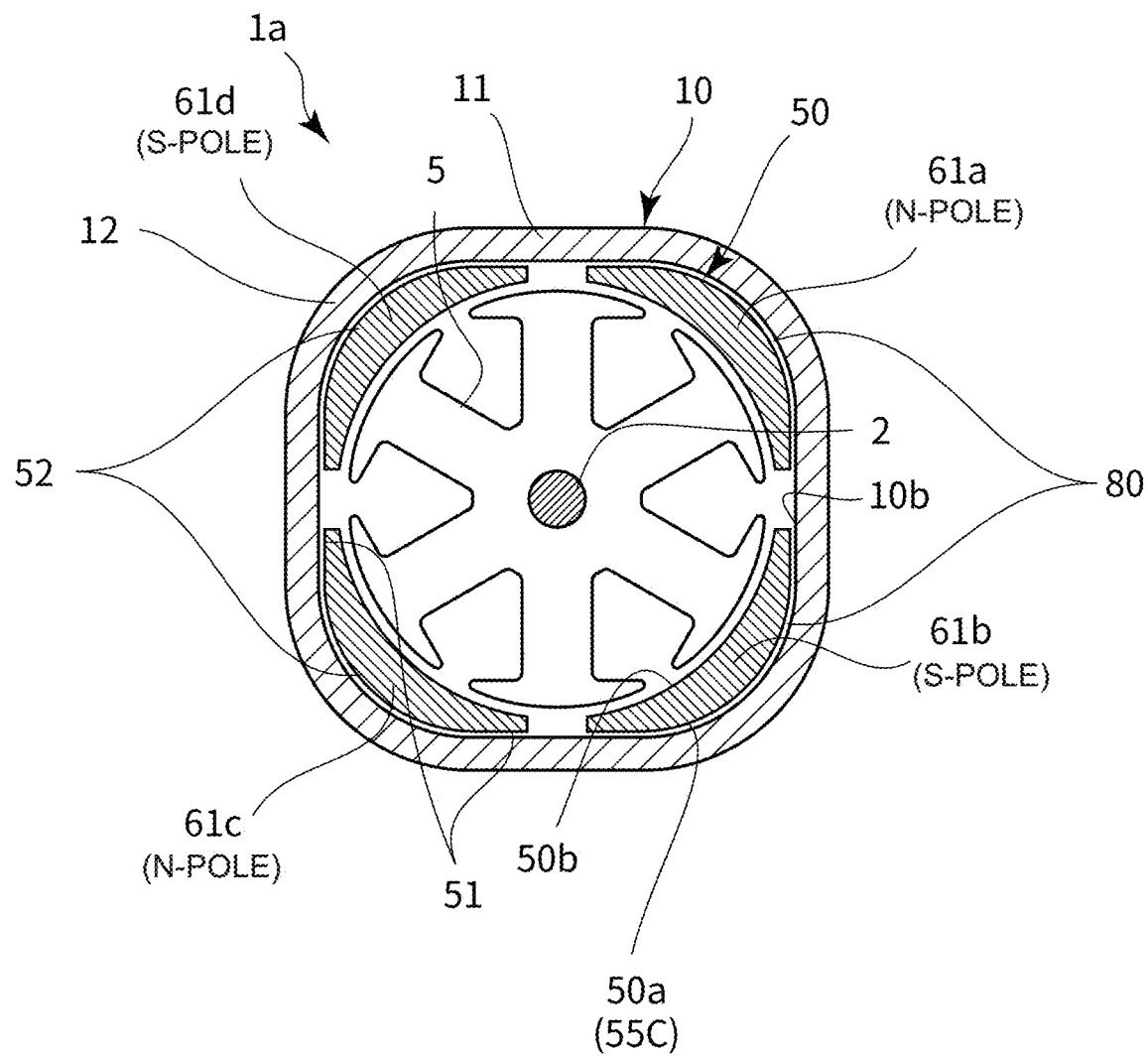
FIG. 5 is a cross-sectional view along a line C-C in FIG. 1.

FIG. 5 is a cross-sectional view along a line C-C in FIG. 1.

The cross section along the line C-C in FIG. 1 is a cross section of a region where the central outer peripheral surface 55C is arranged. As shown in FIG. 5, the adhesive 70 is not disposed between the outer peripheral surface 50a of the magnet 50 and the inner peripheral surface 10b of the frame 10 in this region. That is, the gap 80 extending in the circumferential direction is provided between the outer peripheral surface 50a of the magnet 50 and the inner peripheral surface 10b of the frame 10.

Figure 6:
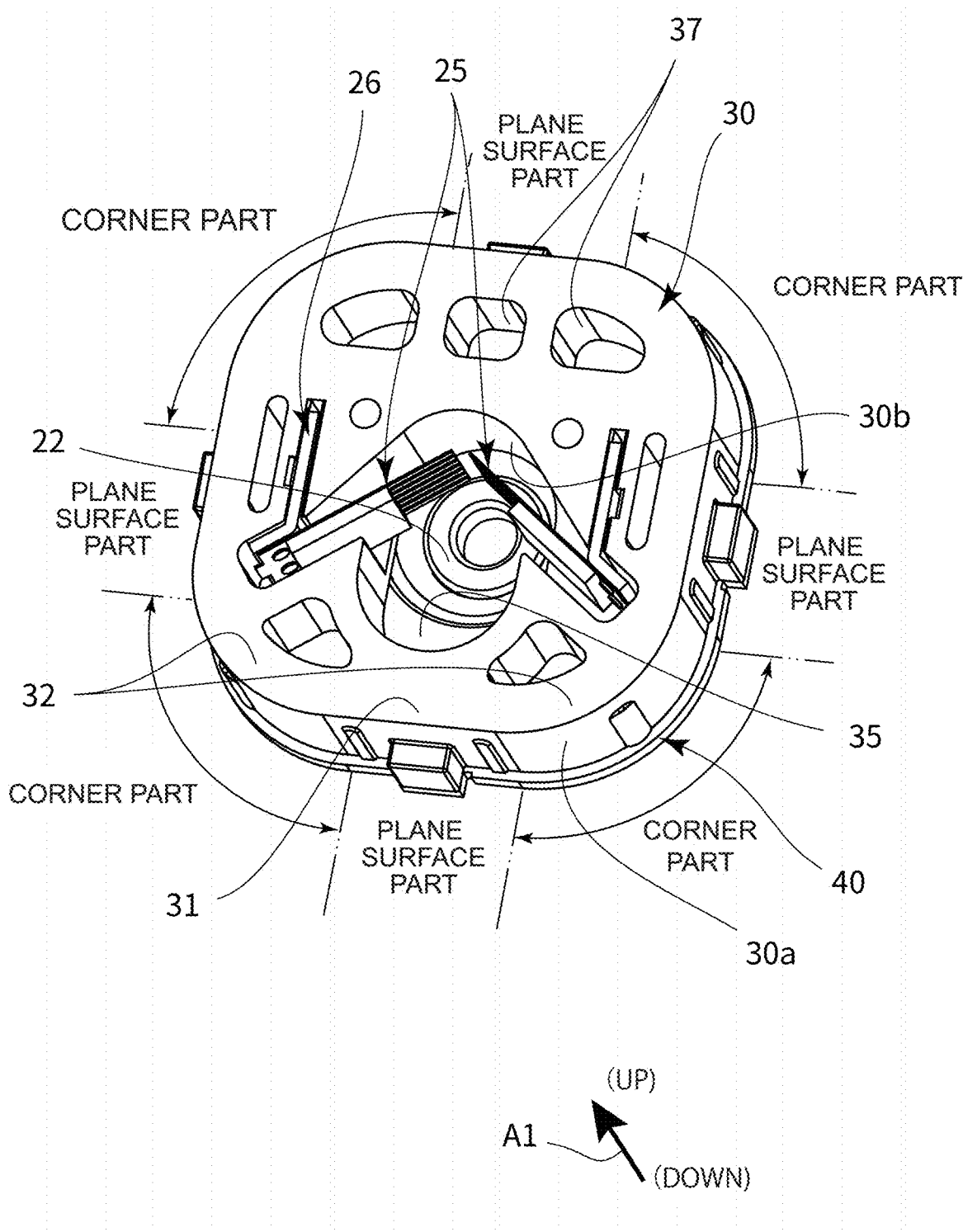
FIG. 6 is a perspective view illustrating a bracket and a plate.

FIG. 6 is a perspective view illustrating the bracket 30 and the plate 40.

FIG. 6 shows the upper parts of the bracket 30 and the plate 40. As shown in FIG. 6, two terminals 26 are attached to the bracket 30. One end portion of each brush 25 is connected to the terminal 26. The two brushes 25 are supported by the respective terminals 26. Another end portion of each brush 25 is in contact with the commutator 7 of the armature assembly 1b.

The bracket 30 is molded, for example, of a resin member. The bracket 30 has a thickness in the rotational shaft direction. The bracket 30 includes a tubular portion having an opening 35 through which the rotational shaft 2 passes. In the present embodiment, the bracket 30 is a tubular portion including the opening 35 at the center. The brushes 25 are disposed in the opening 35. The rotational shaft 2 penetrates the opening 35. The bracket 30 includes an outer peripheral surface 30a having a closed annular shape. That is, the tubular portion includes the outer peripheral surface 30a.

Roughly speaking, the outer peripheral surface 30a of the tubular portion has substantially the same shape as the inner peripheral surface 10b of the frame 10 when seen from the rotational shaft direction (in a plan view). That is, the bracket 30 includes four corner parts 32 and plane surface parts 31 provided between two neighboring corner parts 32. The outer peripheral surface 30a of the tubular portion is provided at the four corner parts 32 and the four plane surface parts 31. As shown in FIG. 1, the outer peripheral surface 30a of the bracket 30 extends toward the magnet 50 in the rotational shaft direction. The length of the bracket 30 in the rotational shaft direction is slightly greater than, for example, the size of the brush 25 in the rotational shaft direction. The brush 25 is accommodated inside the opening 35.

The bracket 30 is provided with recessed portions 37 formed so as to be recessed from top to bottom. A resin member is arranged between the outer peripheral surface 30a of the tubular portion and the inner peripheral surface 30b forming the opening 35 except the recessed portions 37 and other holes. The arrangement of the recessed portions 37 facilitates molding of the bracket 30. The bracket 30 has rigidity in the radial direction. That is, the thickness of the bracket 30 in the radial direction is secured to a certain degree from the outer peripheral surface 30a toward the inside, and the bracket 30 is hardly distorted even when a force in the radial direction is applied to part of the outer peripheral surface 30a. The recessed portions 37 are provided with the rigidity of the bracket 30 taken into consideration so that the rigidity in the radial direction of the bracket 30 is not lowered significantly.

While the bracket 30 is attached to the frame 10, the outer peripheral surface 30a of the bracket 30 is in contact with the inner peripheral surface 10b of the frame 10. The plane surface part 31 of the outer peripheral surface 30a of the bracket 30 opposite to the plane surface part 11 of the frame 10 has rigidity in the radial direction.

As described above, in the present embodiment, the gap 80 extending in the circumferential direction is provided between the outer peripheral surface 50a of the magnet 50 and the inner peripheral surface 10b of the frame 10 and the adhesive 70 is disposed at both sides of the gap 80. That is, the adhesive 70 is not applied to the central outer peripheral surface 55C having ⅓ of the area of the outer peripheral surface 50a and the adhesive 70 is applied to the top outer peripheral surface 55T and the bottom outer peripheral surface 55B having the remaining ⅔ of the area. Since the region without the adhesive 70 is provided in this way, the amount of the adhesive 70 used can be reduced. Therefore, the weight of the motor 1 can be reduced. Furthermore, the manufacturing cost of the motor 1 can be reduced.

Here, the region for applying the adhesive 70 is limited to the top outer peripheral surface 55T and the bottom outer peripheral surface 55B. This allows a characteristic frequency of the motor 1 in the radial direction to be maintained to a characteristic frequency similar to the characteristic frequency for a case in which the adhesive 70 is applied to the whole region of the outer peripheral surface 50a.

That is, in the case of an inner rotor type motor such as the motor 1, the natural vibration in the radial direction of the assembly combining the magnet 50 and the frame 10 occurs during operation of the motor 1, and noise is thereby occurred. In many cases, for the assembly of the magnet 50 and the frame 10, an annular secondary mode described later is the most representative natural vibration mode. In the motor 1, when the frequency of a higher harmonic of an electromagnetic force in the radial direction coincides with the characteristic frequency in the radial direction of the assembly of the magnet 50 and the frame 10, the amplitude of vibration in the annular secondary mode increases, producing noticeable vibration or noise. Particularly in recent years, a neodymium-based magnet having a relatively high magnetic force is often used as the magnet 50. Thus, the amplitude of the harmonic of the electromagnetic force in the radial direction increases and such resonance may become tangible.

Figure 7:
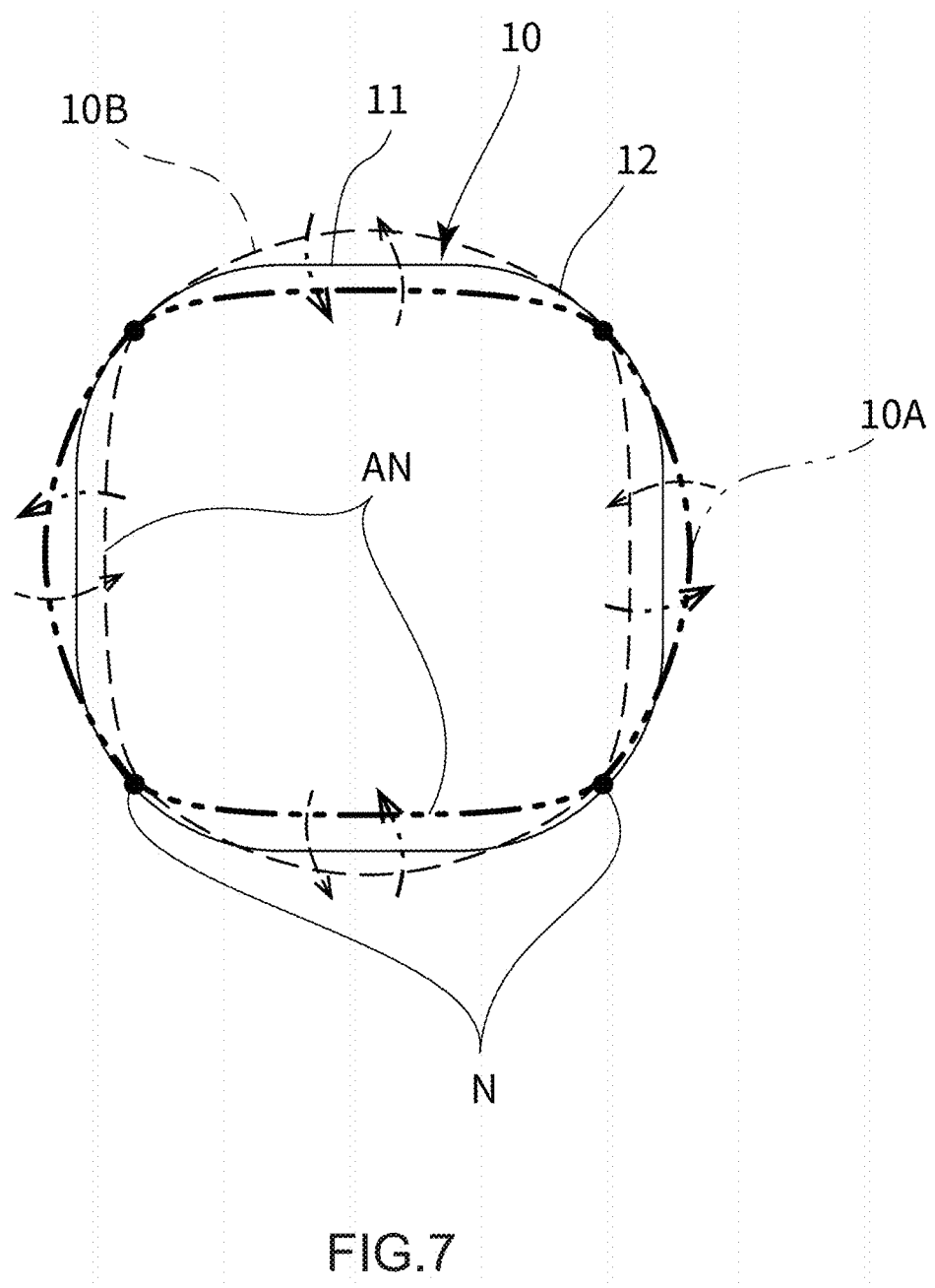
FIG. 7 is a diagram describing a vibration mode of the motor.
Figure 8:
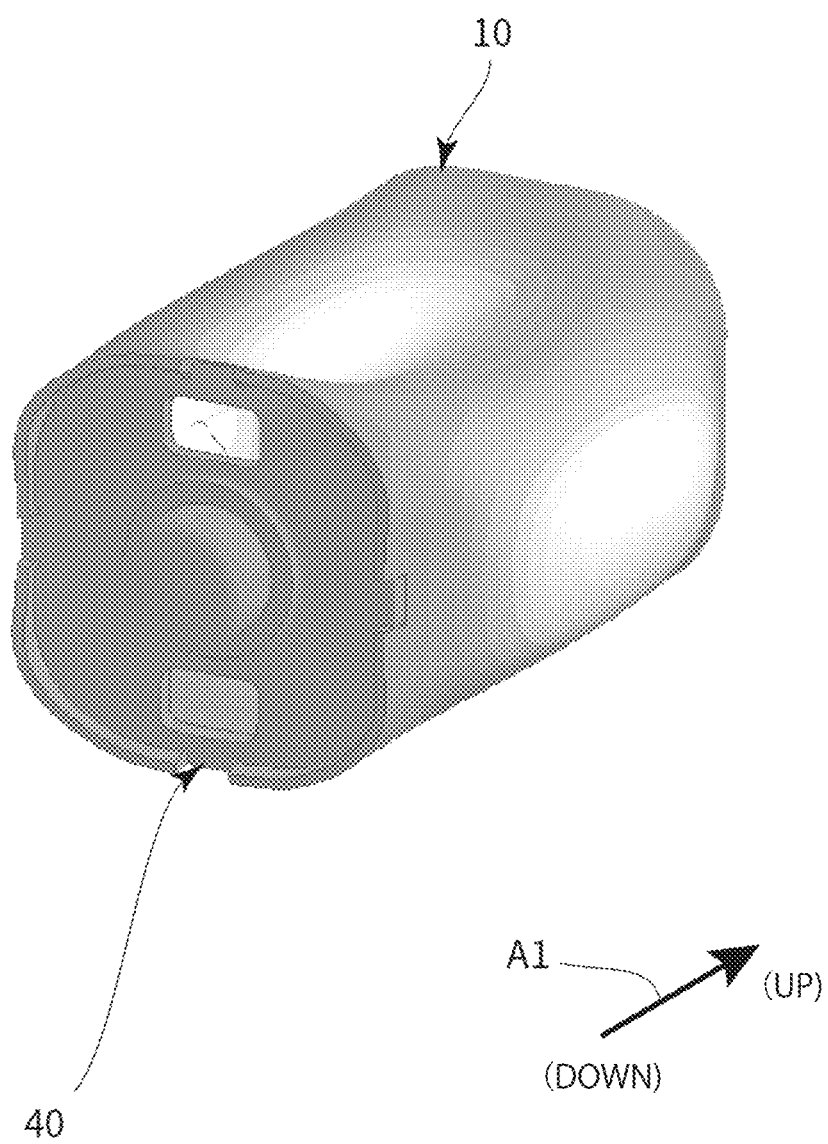
FIG. 8 is a diagram describing an analysis result of the vibration mode of the motor.

FIG. 7 is a diagram describing the vibration mode of the motor 1. FIG. 8 is a diagram describing an analysis result of the vibration mode of the motor 1.

FIG. 7 schematically illustrates a cross section perpendicular to the rotational shaft 2 of the frame 10. In vibration in the annular secondary mode, the frame 10 alternately repeats a deformation state shown by a two-dot dashed line and a deformation state shown by a broken line (deformation amount is shown in an exaggerated manner). That is, nodes N are arranged in the vicinity of the four corner parts 12 and parts near the center of the four plane surface parts 11 become bellies AN. The annular secondary mode can be said to be a mode in which regions facing each other in the radial direction vibrate so as to have mutually reverse phases and regions adjacent to each other vibrate in reverse directions in the radial direction.

FIG. 8 schematically illustrates a deformation state of the motor 1 during vibration in the annular secondary mode through an eigenvalue analysis. In FIG. 8, parts having a greater maximum value of the displacement amount of the frame 10 of the motor 1 are colored with colors in a lower concentration.

When the magnet is coupled to the frame, the adhesive may be applied to the whole outer peripheral surface of the magnet. In this case, the whole outer peripheral surface of the magnet is coupled to the inner peripheral surface of the frame and the magnet and the frame become an integrated structure. In this way, it is possible to shift the characteristic frequency of the annular secondary mode to a high value and suppress generation of electromagnetic vibration noise. On the other hand, when the adhesive is applied to the whole outer peripheral surface of the magnet, the amount of the adhesive used may increase, causing the motor manufacturing cost to increase. Moreover, when the amount of adhesive is substantial, the operation of the motor may become heavy.

In such a case, in the present embodiment, since the adhesive 70 is disposed over limited regions of the top outer peripheral surface 55T and the bottom outer peripheral surface 55B, the amount of the adhesive 70 used can be reduced as described above. Therefore, the manufacturing cost of the motor 1 can be reduced. Furthermore, the weight of the motor 1 can be reduced. Note that either a reduction of the manufacturing cost or a reduction of the weight of the motor 1 may be achieved.

The adhesive 70 is disposed at the top outer peripheral surface 55T and the bottom outer peripheral surface 55B disposed away from each other in the rotational shaft direction of the outer peripheral surface 50a of the magnet 50. Therefore, it is possible to fix the frames 10 separate from each other in the rotational shaft direction with respect to the magnet 50, and thereby assemble the frame 10 and the magnet 50 integrally. An eigenvalue analysis using a simulation has confirmed that in the present embodiment, it is possible to maintain the characteristic frequency in the radial direction to substantially the same degree as in a case where the adhesive 70 is applied to the whole outer peripheral surface 50a of the magnet 50. That is, it is possible to suppress noise caused by vibration to a level similar to the level in the case where the adhesive 70 is applied to the whole outer peripheral surface 50a of the magnet 50. It is possible to achieve a weight reduction of the motor 1 by limiting the characteristic frequency to a region outside the audible region (10 kHz or more) while suppressing abnormal noise.

More specifically, when, for example, the adhesive 70 is disposed over the whole outer peripheral surface 50a, the characteristic frequency in the radial direction is 11734 Hz. In contrast, as in the case of the present embodiment, when the adhesive 70 is disposed in ⅓ of the regions at both ends of the outer peripheral surface 50a, the characteristic frequency in the radial direction is 11665 Hz. The characteristic frequency in the radial direction decreases by only 0.6% compared to the case where the adhesive 70 is disposed over the whole outer peripheral surface 50a. That is, it can be said that even when the adhesive 70 is reduced, substantially no influence is produced on actual vibration or noise. The amount of the adhesive 70 used can be reduced by approximately ⅓ compared to the case where the adhesive 70 is disposed over the whole outer peripheral surface 50*a*. Therefore, the manufacturing cost of the motor 1 can be reduced. The weight of the motor 1 can also be reduced.

In the present embodiment, the outer peripheral surface 30*a* of the bracket 30 is in contact with the inner peripheral surface 10*b* of the frame 10. Therefore, it is possible to support the region where the magnet 50 is not coupled in the rotational shaft direction of the inner peripheral surface 10*b* of the frame 10 by the bracket 30 and suppress vibration of the motor 1. Since the outer peripheral surface 30*a* of the bracket 30 has rigidity in the radial direction, the inner peripheral surface 10*b* of the frame 10 can be reliably supported. Since the outer peripheral surface 30*a* of the bracket 30 extends toward the magnet 50 in the rotating shaft direction, the inner peripheral surface 10*b* of the frame 10 can be reliably supported and vibration of the motor 1 can be suppressed. Furthermore, since the plane surface part 11 of the frame 10 not supported by the magnet 50 can be supported by the outer peripheral surface 30*a* of the bracket 30, it is possible to suppress vibration of the motor 1 and suppress generation of abnormal noise.

The motor 1 uses a set of four magnets 50 divided at the switching part of the magnetic pole element 61 having minor influences on the operation of the motor 1. Thus, it is possible to reduce the amount of the magnet 50 used while maintaining performance of the motor 1. Therefore, it is possible to reduce the manufacturing cost of the motor 1 and reduce the weight of the motor 1.

Description of Modifications

In the following description, members and parts having similar configurations as those described above are assigned the same reference numerals as those described above.

The magnet may have an annular shape.

Figure 9:
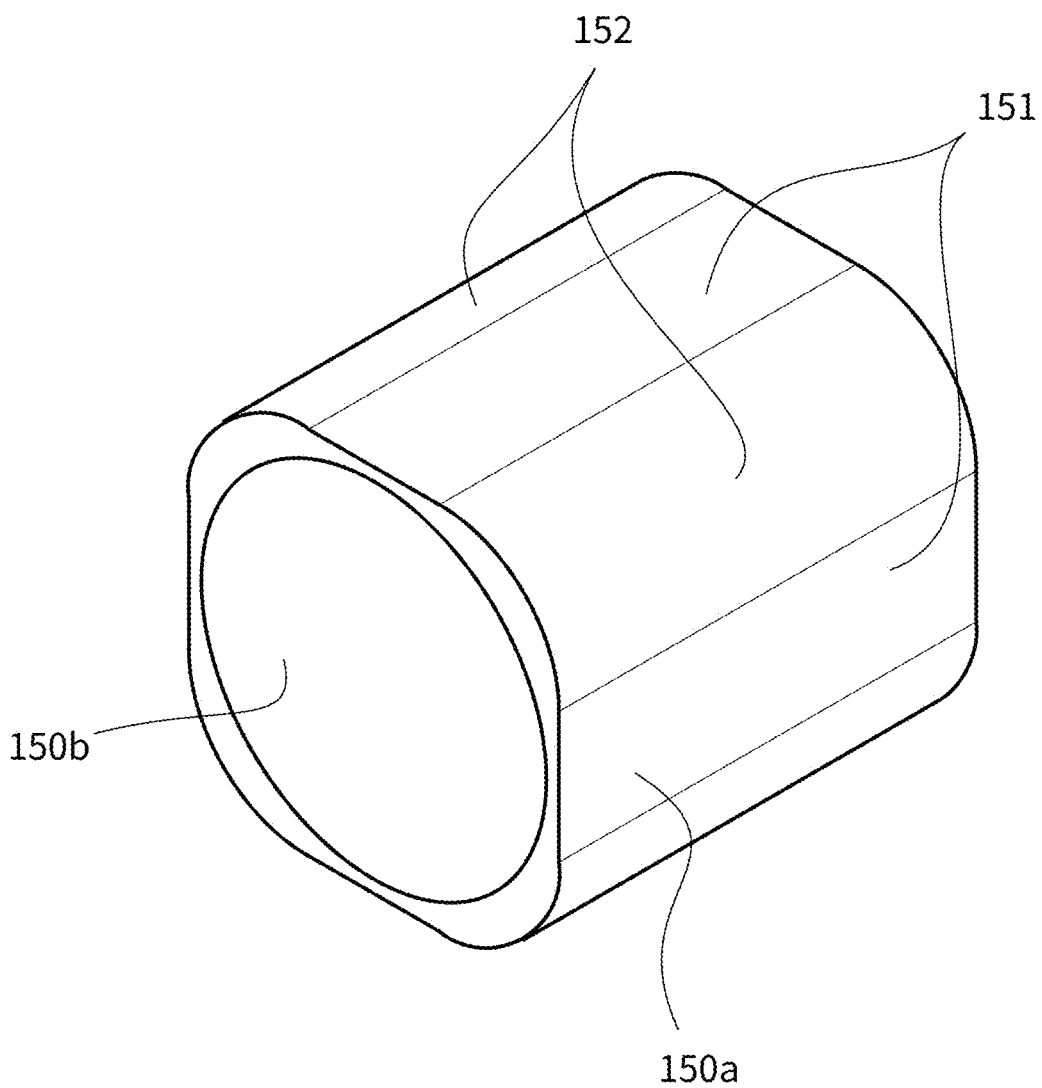
FIG. 9 is a perspective view illustrating a magnet of the motor according to a modification of the present embodiment.

FIG. 9 is a perspective view illustrating a magnet 150 of a motor according to a modification of the present embodiment.

FIG. 9 illustrates the magnet 150 of the motor according to one modification of the present embodiment.

As shown in FIG. 9, the magnet 150 is formed with a single member. The magnet 150 has an annular shape. That is, the magnet 150 is formed into a tubular shape. An inner peripheral surface 150*b* of the magnet 150 is a columnar surface. An outer peripheral surface 150*a* of the magnet 150 has a shape following the inner peripheral surface 150*b* of the frame 10. That is, the magnet 150 includes four corner parts 152 and four plane surface parts 151 arranged between the respective neighboring corner parts 152 so as to correspond to the frame 10.

Figure 10:
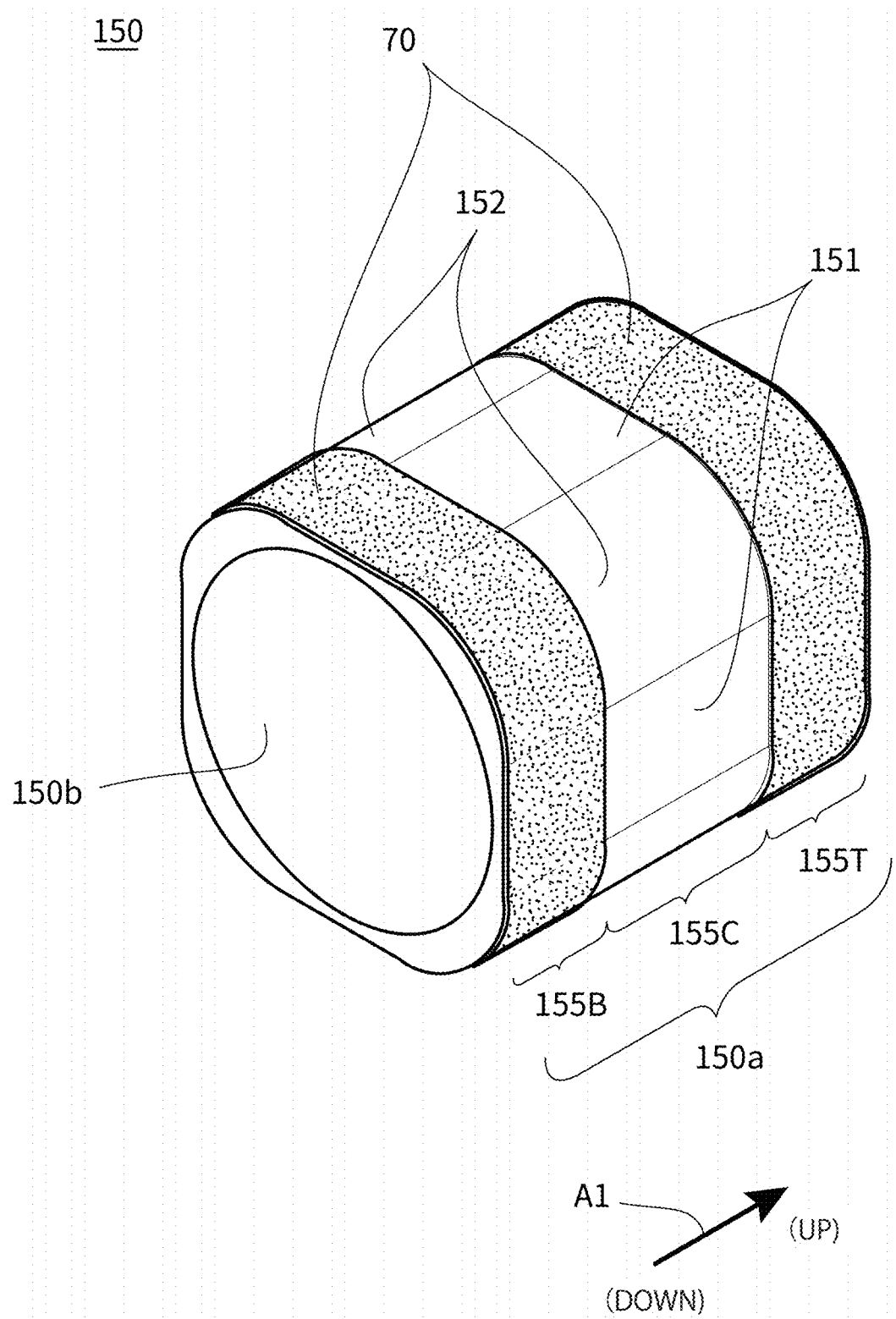
FIG. 10 is a diagram describing a region of the magnet where an adhesive is disposed.

FIG. 10 is a diagram describing a region of the magnet 150 where the adhesive 70 is disposed.

In the present modification as well as the above-described embodiment, the adhesive 70 is disposed over not the whole but only part of the region of the outer peripheral surface 150*a* of each magnet 150. More specifically, just like in the above-described embodiment, description will be given by dividing the outer peripheral surface 150*a* into three areas of a top outer peripheral surface 155T, a central outer peripheral surface 155C and a bottom outer peripheral surface 155B, each representing a ⅓ part in the rotational shaft direction. That is, the adhesive 70 is disposed in two regions of the top outer peripheral surface 155T and the bottom outer peripheral surface 155B. The adhesive 70 is not disposed in the central outer peripheral surface 155C. The adhesive 70 is disposed in the upper region and the lower region in the rotational shaft direction, whereas the adhesive 70 is not disposed in the central region. The adhesive 70 is disposed in the two regions not adjacent to each other of the three regions divided in the rotational shaft direction forming the outer peripheral surface 150*a*.

Figure 11:
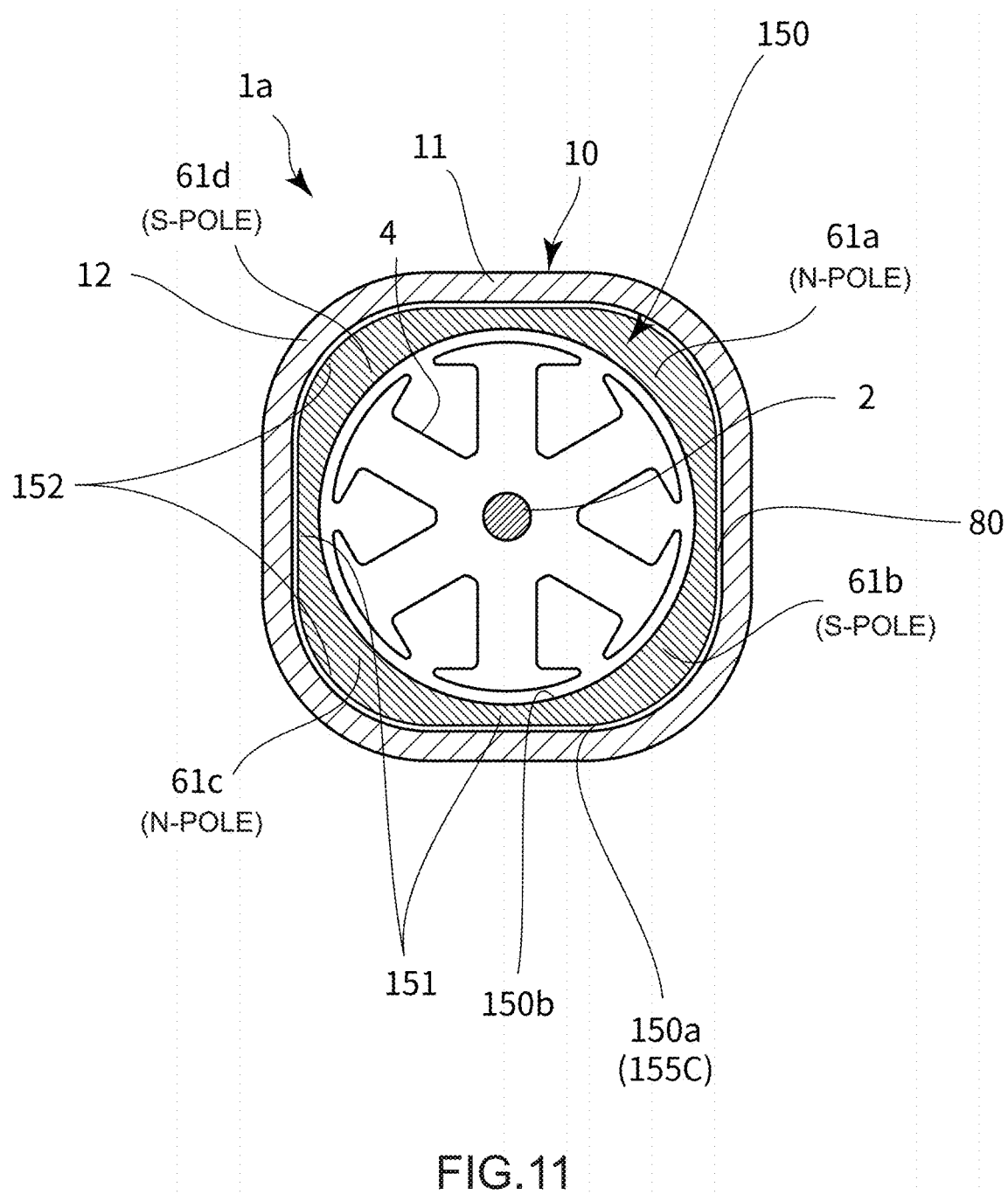
FIG. 11 is a cross-sectional view of the motor according to the present modification.

FIG. 11 is a cross-sectional view of the motor according to the present modification.

The cross section shown in FIG. 11 corresponds to the cross section shown in FIG. 5 of the motor 1 according to the above-described embodiment. That is, the cross section passing through the central outer peripheral surface 155C part is shown. Magnetic pole elements 61 are provided in the four corner parts 152 of the magnet 150 respectively. That is, the magnet 150 includes a plurality of magnetic pole elements 61. Switching portions of the plurality of magnetic pole elements 61 of the magnet 150 are arranged at their respective plane surface parts 11 of the frame 10.

In the present modification, the adhesive 70 is disposed in part of the region of the outer peripheral surface 150*a* of the magnet 150, and so the gap 80 extending in a circumferential direction is provided between the inner peripheral surface 10*b* of the frame 10 and the outer peripheral surface 150*a* of the magnet 150. The adhesive 70 is arranged at both sides of the gap 80 in the rotational shaft direction. That is, the adhesive 70 is arranged between the top outer peripheral surface 155T and the inner peripheral surface 10*b* of the frame 10. Furthermore, the adhesive 70 is arranged between the bottom outer peripheral surface 155B and the inner peripheral surface 10*b* of the frame 10.

Thus, in the present modification, the region in which the adhesive 70 is disposed is limited to the top outer peripheral surface 155T and the bottom outer peripheral surface 155B of the outer peripheral surface 150*a* of the magnet 150, and the adhesive 70 is not disposed in the central outer peripheral surface 155C. In this case, as well as in the above-described embodiment, it is possible to reduce the amount of the adhesive 70 used and prevent vibration. That is, it is possible to maintain the characteristic frequency in the radial direction of the assembly of the frame 10 and the magnet 150 at the same level with the characteristic frequency in the case where the adhesive 70 is applied to the whole outer peripheral surface 150*a* of the magnet 150. Therefore, it is possible to suppress generation of abnormal noise in the motor 1 and reduce the weight of the motor 1. Furthermore, it is possible to achieve both suppression of generation of abnormal noise in the motor 1 and a reduction of the manufacturing cost of the motor 1.

Note that the adhesive 70 may also be disposed in a plurality of regions not adjacent to each other of the three or more regions divided in the rotational shaft direction forming the outer peripheral surface 50*a* or 150*a* of the magnet 50 or 150. As an example, a case will be described where a region to which the adhesive 70 is not applied for the magnet 150 is divided into two portions. Note that the arrangement mode of the adhesive 70 is not limited to this.

Figure 12:
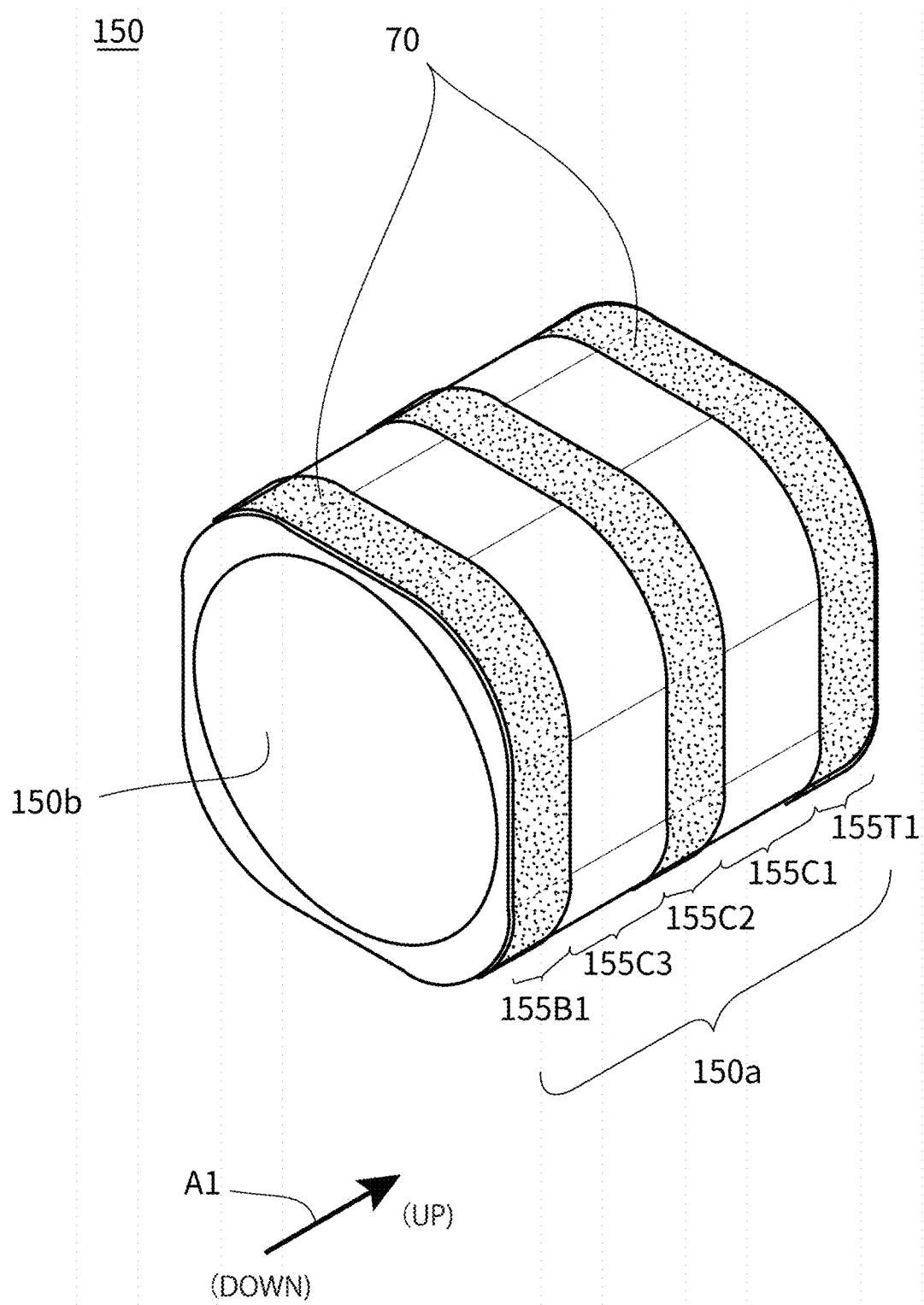
FIG. 12 is a diagram describing a disposition example of an adhesive on the magnet.

FIG. 12 is a diagram describing an arrangement example of the adhesive 70 at the magnet 150.

In the example shown in FIG. 12, the outer peripheral surface 150*a* is shown by being divided into five regions in the rotational shaft direction. That is, the outer peripheral surface 150*a* is formed with five regions of a top outer peripheral surface 155T1, a first central outer peripheral surface 155C1, a second central outer peripheral surface 155C2, a third central outer peripheral surface 155C3 and a bottom outer peripheral surface 155B1 from the top side.

At this time, the adhesive 70 can be disposed, for example, at the top outer peripheral surface 155T1, the second central outer peripheral surface 155C2 and the bottom outer peripheral surface 155B1. That is, the adhesive 70 is not disposed at the first central outer peripheral surface 155C1, or the third central outer peripheral surface 155C3. In this way, the gap 80 is provided between the first central outer peripheral surface 155C1 and the inner peripheral surface 10b of the frame 10. The gap 80 is also provided between the third central outer peripheral surface 155C3 and the inner peripheral surface 10b of the frame 10. The adhesive 70 is disposed at both sides of each gap 80 in the rotational shaft direction.

In such an arrangement mode of the adhesive 70, it is possible to reduce the amount of the adhesive 70 used in the same way as in the above case and also suppress generation of abnormal noise in the motor 1.

Furthermore, unlike the disposition example shown in FIG. 12, the adhesive 70 may be disposed at the first central outer peripheral surface 155C1 and the third central outer peripheral surface 155C3. In this way, the gap 80 is provided between the second central outer peripheral surface 155C2 and the inner peripheral surface 10b of the frame 10. The adhesive 70 is disposed at both sides of the gap 80 in the rotational shaft direction.

In such an arrangement mode of the adhesive 70, it is possible to reduce the amount of the adhesive 70 used and suppress generation of abnormal noise in the motor 1 in the same way as in the above case. Particularly by disposing the adhesive 70 such that the adhesive 70 is arranged at both sides of the gap 80 in the rotational shaft direction in this way, it is possible to suppress generation of abnormal noise in the motor 1 compared to a case where the same amount of the adhesive 70 is applied to a collective region at the outer peripheral surface 150a of the magnet 150.

Figure 13:
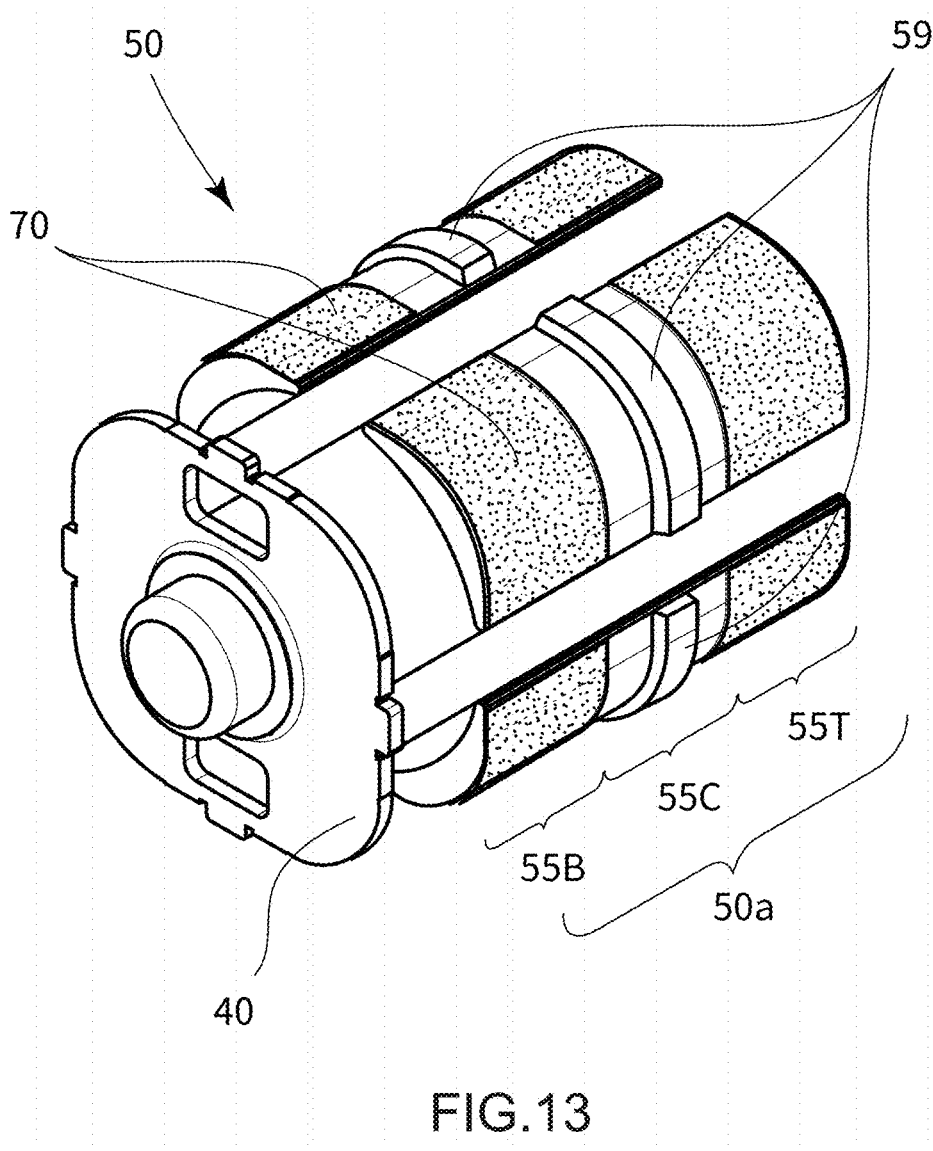
FIG. 13 is a perspective view illustrating a magnet of the motor according to another modification of the present embodiment.

FIG. 13 is a perspective view illustrating the magnet 50 of the motor according to another modification of the present embodiment.

In the present embodiment, ribs 59 may also be provided at the outer peripheral surface 50a of the magnet 50. The ribs 59 are disposed, for example, at the central outer peripheral surface 55C where the adhesive 70 is not disposed. The ribs 59 extend from the outer peripheral surface 50a in the radial direction. The ribs 59 are provided at the four magnets 50 respectively. The ribs 59 extend in the circumferential direction.

The ribs 59 are, for example, reinforcing members formed separately from the magnet 50. That is, the ribs 59 are members that are different from the magnet 50. The ribs 59 are coupled to, for example, the magnet 50. Note that the method of attaching the ribs 59 to the magnet 50 is not limited to this. The ribs 59 may be formed with metal or resin or other materials. Note that the ribs 59 may be formed with the same member as the member of the magnet 50. That is, the ribs 59 may be formed when the magnet 50 is molded.

When the ribs 59 are formed at the magnet 50 in this way, the ribs 59 remain in contact with the inner peripheral surface 10b while the magnet 50 is coupled to the inner peripheral surface 10b of the frame 10. Thus, at the part where the gap 80 is provided between the frame 10 and the magnet 50, the frame 10 remains urged by the ribs 59. Thus, the parts where the magnet 50 of the frame 10 is not coupled are supported by the ribs 59 and the characteristic frequency of the assembly of the frame 10 and the magnet 50 increases. Therefore, it is possible to suppress vibration of the motor 1 and suppress generation of abnormal noise in the motor 1.

Note that when the above-described annular magnet 150 is used, ribs may be provided likewise. The ribs may be provided at the central outer peripheral surface 155C of the magnet 150 so as to contact the inner peripheral surface 10b of the frame 10.

Figure 14:
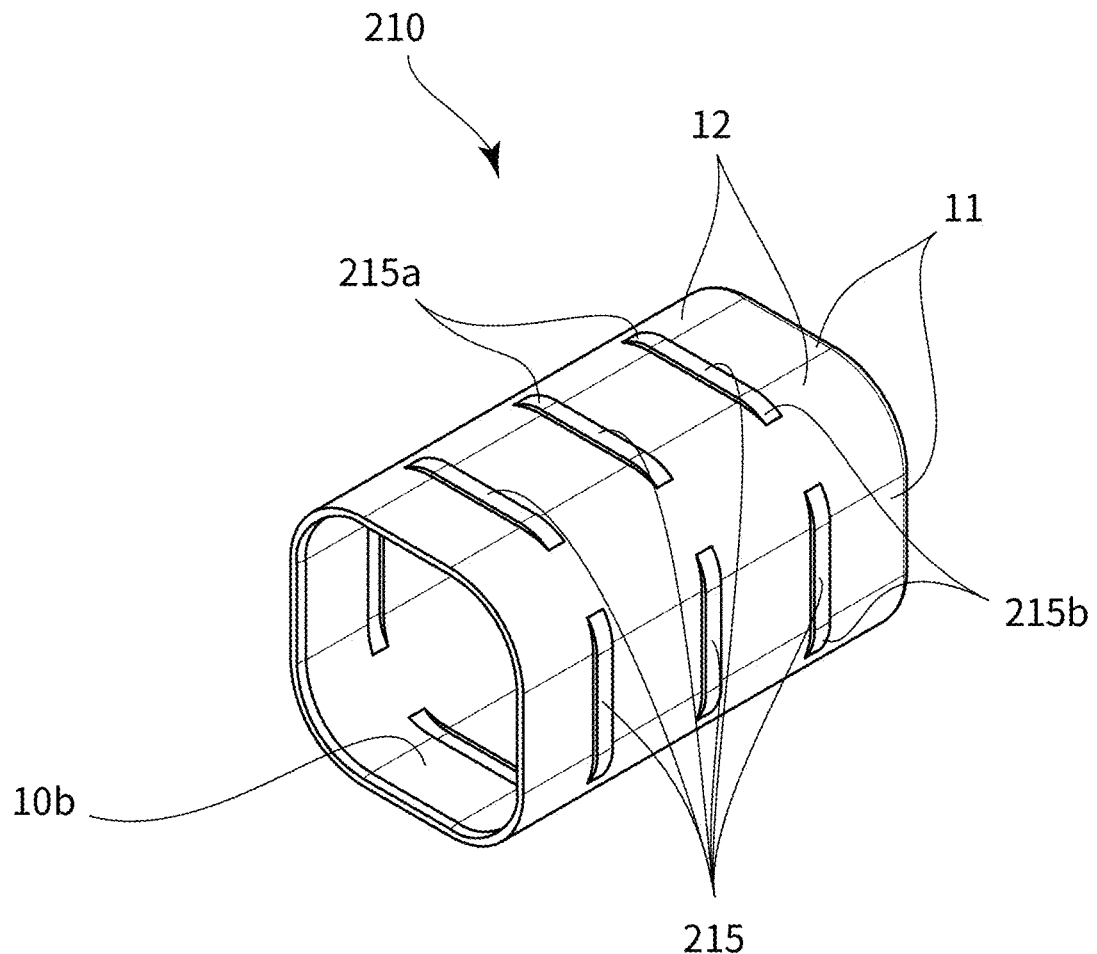
FIG. 14 is a perspective view illustrating a frame according to a further modification of the present embodiment.

FIG. 14 is a perspective view illustrating a frame 210 according to another modification of the present embodiment.

A frame including reinforcing members or ribs at a side face may also be used. Alternatively, a frame provided with reinforcing members or ribs at a side face of the frame may be used. The reinforcing members or ribs extend in the radial direction. The reinforcing members or ribs extend in the circumferential direction. The reinforcing members or ribs are reinforcing elements for increasing rigidity of the frame.

More specifically, for example, in the case of the frame 210 shown in FIG. 14, three ribs 215 are formed at four plane surface parts 11 respectively. The three ribs 215 are disposed at substantially equal intervals in the rotational shaft direction. Each rib 215 extends from the outer peripheral surface of the frame 210 to outside the frame 210 in the radial direction. That is, each rib 215 projects outward from the outer peripheral surface of the frame 210. Each rib 215 extends in a direction substantially perpendicular to the plane surface part 11 where each rib 215 is formed.

Each rib 215 extends in the circumferential direction. In the present modification, end portions 215a and 215b of each rib 215 are provided at the corner part 12. That is, each rib 215 is provided at the plane surface part 11, and one end portion 215a of the rib 215 is arranged at one of the corner parts 12 adjacent to the plane surface part 11. Furthermore, the other end portion 215b of the rib 215 is arranged at the other corner part 12.

Each rib 215 is a protruding portion formed at the frame 210. That is, a part where each rib 215 is provided is recessed in the inner peripheral surface 10b of the frame 210. The rib 215 can be provided by applying press work or the like to a metal plate forming the frame 210.

Since the ribs 215 are formed at the frame 210 in this way, the characteristic frequency of the frame 210 becomes higher compared to the case where no ribs 215 are formed. Therefore, it is possible to suppress vibration of the motor 1 and suppress generation of abnormal noise in the motor 1.

Since the ribs 215 extend in the circumferential direction and the end portions 215a and 215b are positioned at the corner parts 12, it is possible to improve rigidity of the frame 210 and increase the characteristic frequency of the frame 210. Since the ribs 215 are protruding portions formed at the frame 210, it is possible to easily form the ribs 215 and thereby reduce the manufacturing cost of the motor 1.

Note that the direction in which the ribs extend may be a direction toward the rotational shaft 2. The number of ribs may be different from the above-described number. The ribs extending in the circumferential direction may not only be ribs having a longitudinal direction extending in the circumferential direction as described above, but also include ribs having a traverse direction extending in the circumferential direction.

Figure 15:
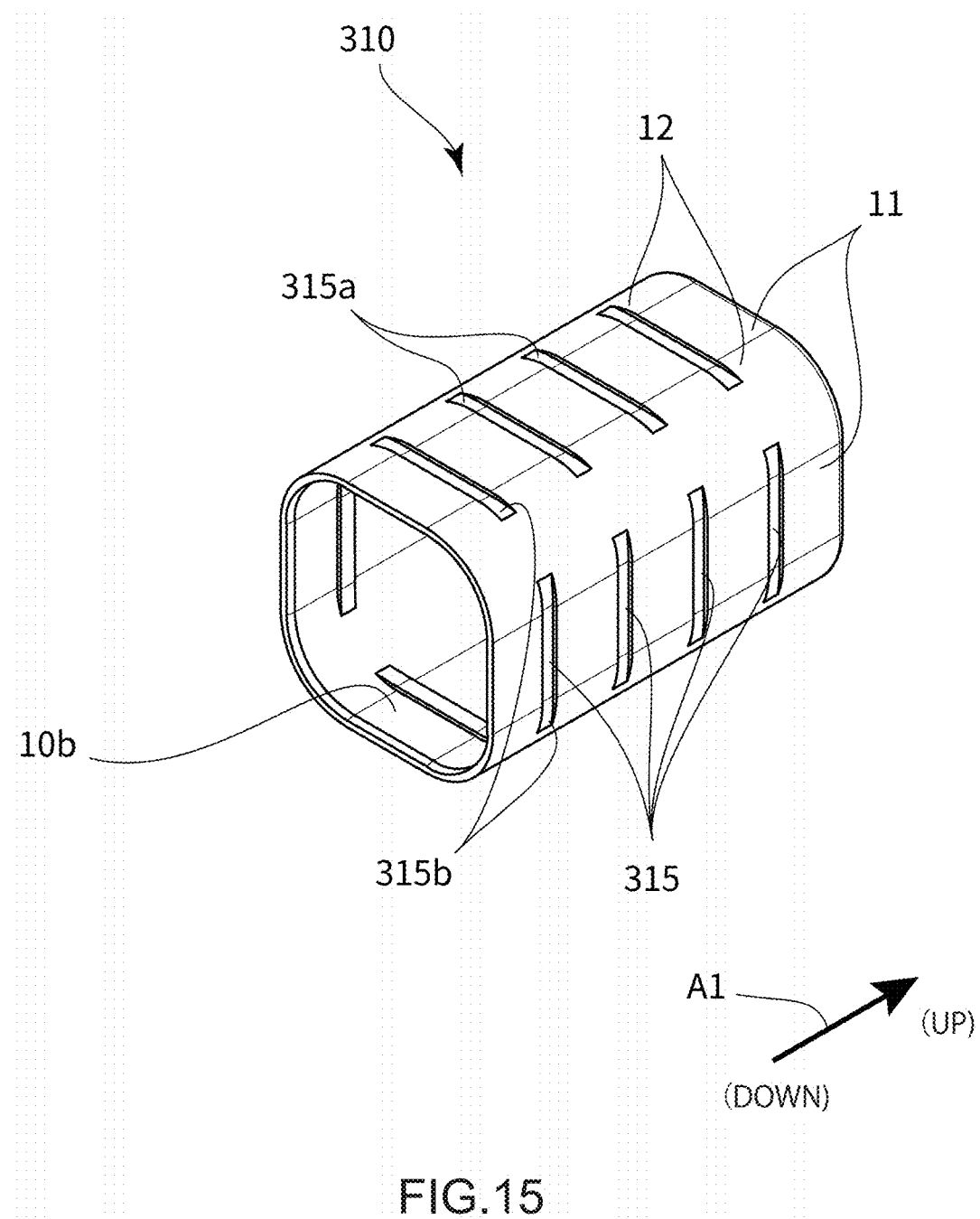
FIG. 15 is a perspective view illustrating a frame according to a still further modification of the present embodiment.

FIG. 15 is a perspective view illustrating a frame 310 according to a further modification of the present embodiment.

The frame 310 shown in FIG. 15 is provided with four ribs 315 at four plane surface parts 11 respectively. The four ribs 315 are disposed at substantially equal intervals in the rotational shaft direction. Each rib 315 extends from the inner peripheral surface 10b of the frame 310 to inside the frame 310 in the radial direction. That is, each rib 315 projects inward from the inner peripheral surface 10b of the frame 310.

Each rib 315 extends in the circumferential direction. In the present modification, end portions 315a and 315b of the respective ribs 315 are provided at the corner parts 12. That is, one end portion 315a of the rib 315 is arranged at one of the corner parts 12 adjacent to the plane surface part 11 where each rib 315 is provided. Furthermore, the other end portion 315b of the rib 315 is arranged at the other corner part 12.

Each rib 315 is a recessed portion formed in the frame 310. That is, the part where each rib 315 is provided is recessed at the outer peripheral surface of the frame 310. The rib 315 can be provided by applying press work or the like to the metal plate forming the frame 310.

The frame 310 where such ribs 315 are formed can also increase the characteristic frequency in the same way as in the aforementioned frame 210 and suppress generation of abnormal noise in the motor 1.

The frame may be provided with reinforcing members formed with members different from the member of the frame instead of the above-described ribs 215 and 315 and a frame including reinforcing members may be used. The reinforcing members may be provided at the plane surface parts of the frame so as to extend in the radial direction. Providing such reinforcing members also makes it possible to increase the characteristic frequency of the frame and suppress generation of abnormal noise in the motor 1.

Figure 16:
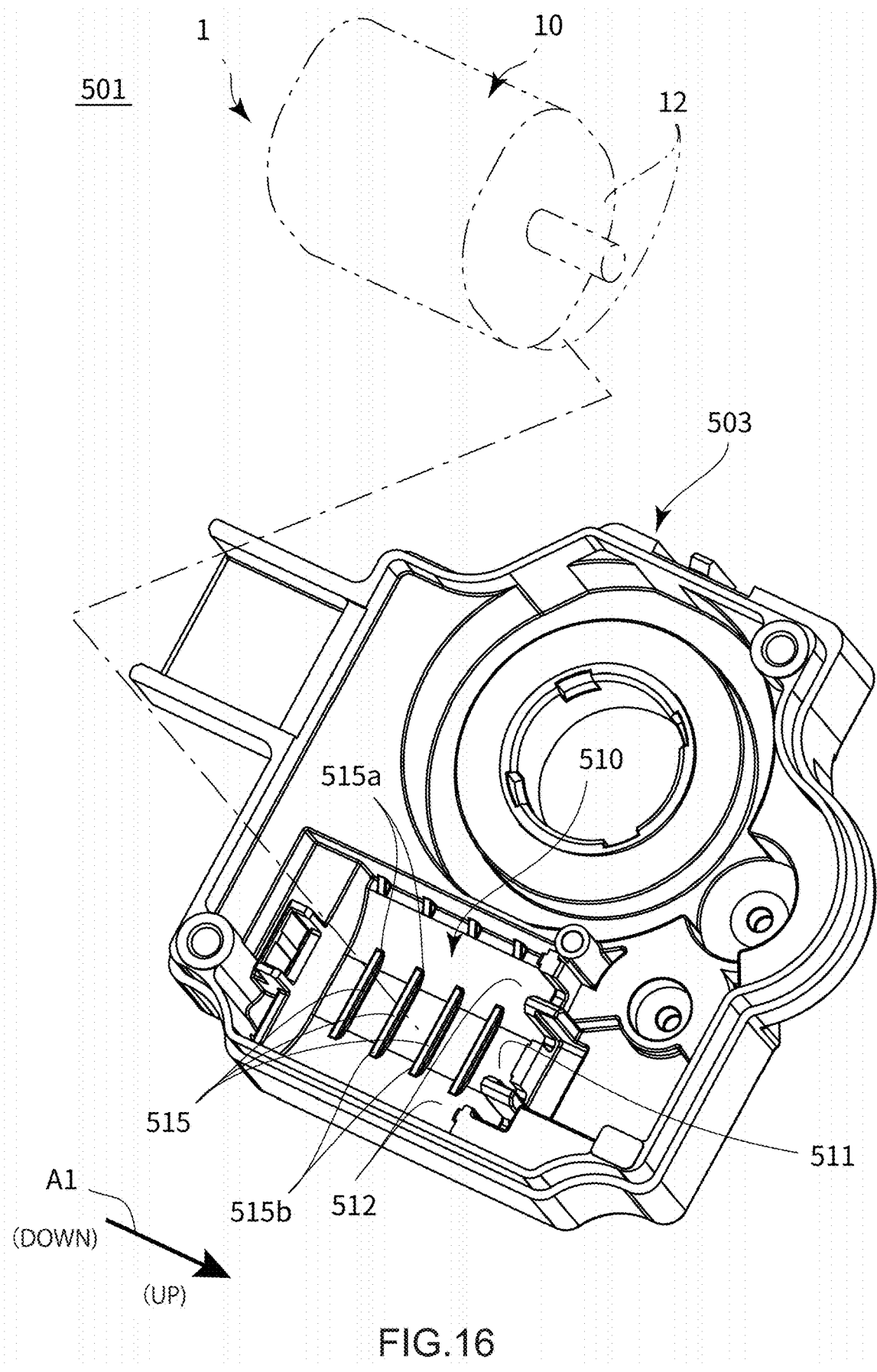
FIG. 16 is a perspective view describing a configuration of an actuator according to a still further modification of the present embodiment.

FIG. 16 is a perspective view describing a configuration of an actuator 501 according to a still further modification of the present embodiment.

The actuator 501 configured using the motor 1 or other motor according to the present embodiment or modifications of the present embodiment may also be provided with reinforcing members or ribs. The reinforcing members or ribs are a biasing means for biasing the frame of the motor.

For example, FIG. 16 illustrates the actuator 501 including the motor 1 and a structure for mounting the motor 1 in a housing 503 of the actuator 501. In FIG. 16, illustrations of components (e.g., gears and screws or the like) of the actuator 501 except for part of the housing 503 and the motor 1 are omitted.

The housing 503 of the actuator 501 is provided with an accommodating part 510 for the motor 1. The motor 1 is accommodated in the accommodating part 510 and mounted in the housing 503 of the actuator 501.

The accommodating part 510 is provided with two corner parts 512 and a plane surface part (an example of the surface part) 511 arranged between the two neighboring corner parts 512. The corner parts 512 and the plane surface part 511 have shapes corresponding to the shape of the frame 10 of the motor 1.

The plane surface part 511 is provided with, for example, four ribs 515. The four ribs 515 are disposed at substantially equal intervals in the rotational shaft direction. Each rib 515 extends in a direction substantially perpendicular to the plane surface part 511 in the rotational shaft direction. That is, the ribs 515 extend in the radial direction of the motor 1 disposed in the accommodating part 510. The ribs 515 extend in the circumferential direction with respect to the motor 1 disposed in the accommodating part 510.

Each rib 515 extends in the circumferential direction. In the present modification, end portions 515a and 515b of each rib 515 are provided at the corner parts 512. That is, each rib 515 is provided at the plane surface part 511, and one end portion 515a of the rib 515 is arranged at one of the corner parts 512 adjacent to the plane surface part 511. On the other hand, the other end portion 515b of the rib 515 is arranged at the other corner part 512.

Figure 17:
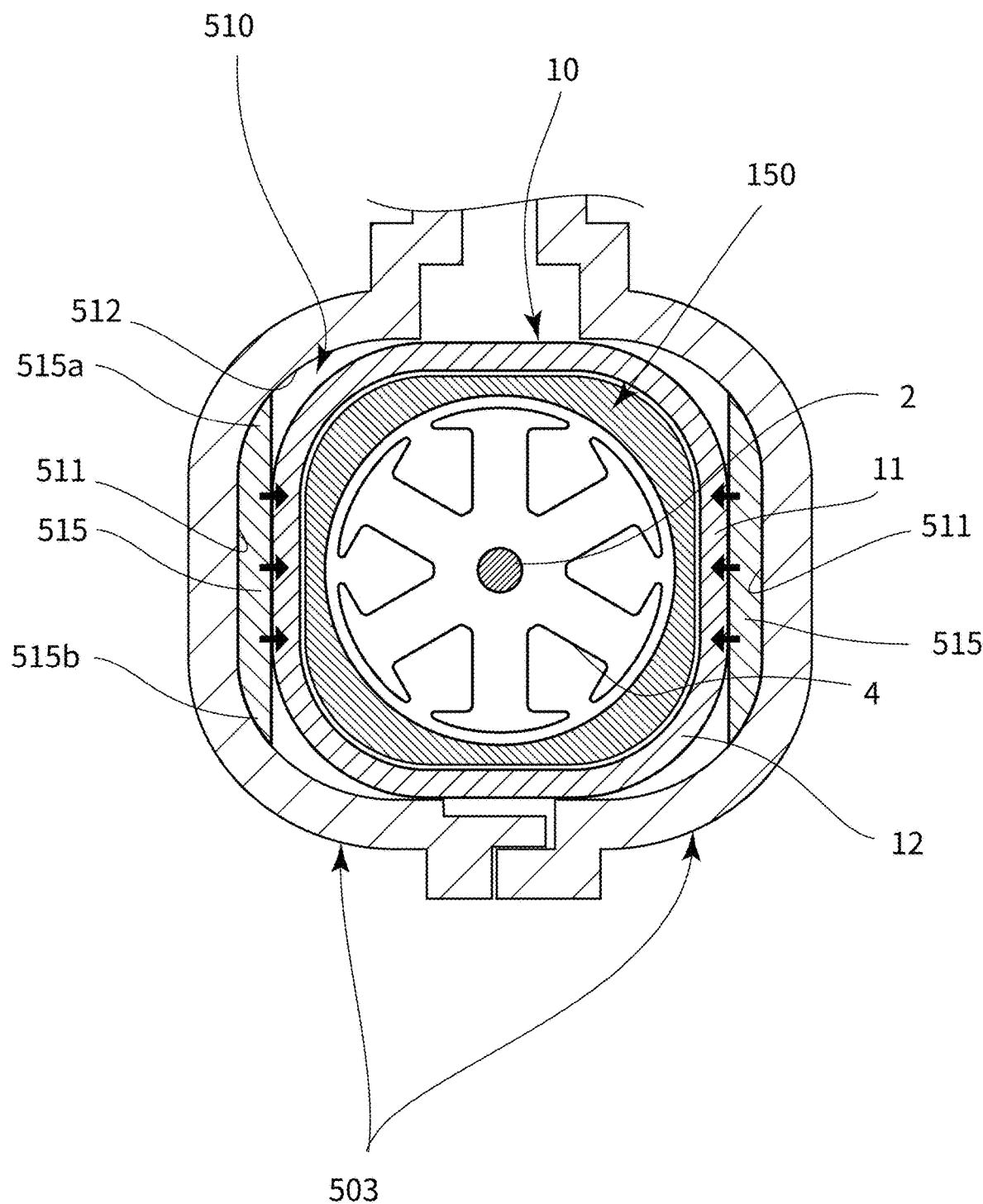
FIG. 17 is a cross-sectional view of the housing part perpendicular to the rotational shaft.

FIG. 17 is a cross-sectional view of the accommodating part 510 perpendicular to the rotational shaft 2.

As shown in FIG. 17, the motor 1 in the present modification is accommodated in the accommodating part 510, for example, by being sandwiched between two members forming a housing 503 of the actuator 501. In the accommodating part 510, the ribs 515 provided at two plane surface parts 511 facing each other (left and right plane surface parts 511 in FIG. 17) extend in the radial direction with respect to the motor 1. The ribs 515 are in contact with the outer peripheral surfaces of the plane surface parts 11 of the frame 10 of the motor 1 and bias the plane surface parts 11 toward the inside of the motor 1.

Thus, since the frame 10 of the motor 1 is urged by the ribs 515, vibration of the frame 10 is suppressed by the ribs 515. Therefore, it is possible to suppress generation of abnormal noise in the motor 1 and the actuator 501.

The ribs 515 extend in the circumferential direction with respect to the motor 1, and since end portions 515a and 515b are arranged at the corner parts 512, it is possible to improve rigidity of the accommodating part 510 of the housing 503. Thus, it is possible to reliably bias the frame 10 and more reliably suppress vibration of the motor 1.

Note that the ribs 515 are formed with, for example, resin. The ribs 515 are protruding portions formed when the housing 503 is molded. Since the ribs 515 can be easily formed, it is possible to suppress the manufacturing cost of the motor 1 to a low level. Instead of the ribs 515, reinforcing members formed with a member different from the member of the housing 503 may be provided in the accommodating part 510 of the housing 503. Like the ribs 515, the reinforcing members may only be provided at the plane surface part 511 of the accommodating part 510 so as to extend in the radial direction of the motor 1. Providing such reinforcing members can also suppress vibration of the motor 1 and suppress generation of abnormal noise in the motor 1 and the actuator 501. Transmission of vibration may be suppressed by ribs formed between a plurality of recessed portions of the housing 503 instead of the ribs 515. In this case, the plurality of recessed portions and ribs are arranged side by side in the rotational shaft direction in the housing 503. Furthermore, transmission of vibration may be suppressed by the ribs formed between the plurality of recessed portions together with the ribs 515.

Others

The motor and the actuator may be configured by combining the configurations of the respective components according to the above-described embodiment and modifications. As described above, the gap extending in the circumferential direction is provided between the inner peripheral surface of the frame and the outer peripheral surface of the magnet, and, if the adhesive is disposed at both sides of the gap, it is possible to suppress generation of abnormal noise in the same way as in the above-described case.

In the frame, magnet and accommodating part, the plane surface parts may not be planar but may be a protruding portion and a recessed portion or slightly curved. A curved surface having a large radius of curvature relative to a corner part can be called a "plane surface part."

In the above-described embodiment, the motor has a substantially square cross-sectional shape perpendicular to the rotational shaft, but the shape of the motor is not limited to this. In the case of, for example, a hexagonal or octagonal motor, if a gap extending in the circumferential direction is provided between the inner peripheral surface of the frame and the outer peripheral surface of the magnet as described above and an adhesive is disposed at both sides of the gap, it is possible to suppress generation of abnormal noise in the same way as in the above-described case. In the case of a columnar motor having a tubular frame, it is also possible to achieve effects similar to the above-described effects.

The motor is not limited to the above-described DC motor with a brush. Using a configuration similar to the configuration of the above-described embodiment for motors of various formats (brushless, etc) makes it possible to suppress generation of abnormal noise in the motor.

It should be noted that the above-described embodiment is illustrative in all aspects and is not restrictive. The scope of the present disclosure is shown not by the above description but by the scope of claims and it is intended that meanings equal to the scope of claims and all changes within the scope are included.

What is claimed is:

1. An actuator comprising:
a motor; and
a housing including an accommodating part for the motor, the housing being formed with two members, wherein the motor includes:
a frame including a plurality of corner parts and a surface part arranged between two neighboring corner parts of the frame; and
one or a plurality of magnets disposed inside the frame, wherein,
the magnet and the frame are coupled with an adhesive in a rotational shaft direction,
magnetic pole elements of the one or the plurality of magnets are disposed at the plurality of corner parts of the frame,
regions of the frame facing in a radial direction of the motor vibrate in reverse directions relative to each other during operation of the motor,
a node of the vibration of the frame is arranged at the corner part of the frame,
a belly of the vibration of the frame is arranged at the surface part of the frame,
regions of the frame adjacent to each other vibrate in reverse directions relative to each other during operation of the motor,
a reinforcing member is provided at the frame and extends in a circumferential direction along the surface part of the frame,
the reinforcing member extends in the radial direction between the frame and the accommodating part,
the reinforcing member is formed with a member different from a member of the frame,
the accommodating part includes a plurality of corner parts and a surface part arranged between two neighboring corner parts of the accommodating part,
a rib is provided at the surface part of the accommodating part, and
the rib extends in a circumferential direction with respect to the motor disposed in the accommodating part.

2. The actuator according to claim 1, wherein
a plurality of reinforcing members are provided at the frame, the plurality of reinforcing members including the reinforcing member,
a plurality of ribs are provided at the housing, the plurality of ribs including the rib,
the reinforcing member and the rib urge the surface part of the frame toward the inside of the motor.

3. The actuator according to claim 1, wherein an end portion of the rib is provided at one of the two neighboring corner parts of the accommodating part.

4. The actuator according to claim 1, wherein the rib is formed with a protruding portion or is formed between a plurality of recessed portions of the housing.

5. The actuator according to claim 1, wherein a plurality of reinforcing members are provided at the frame, the plurality of reinforcing members including the reinforcing member, a plurality of ribs are provided at the housing, the plurality of ribs including the rib, and
the plurality of the reinforcing members and the plurality of the ribs are arranged on an end portion side of the frame with respect to the center of the surface part of the frame.

6. The actuator according to claim 1, wherein the reinforcing member is provided at the corner part and the surface part of the frame.

7. An actuator comprising:
a motor; and
a housing including an accommodating part for the motor, the housing being formed with two members, wherein the motor includes:
a frame including a plurality of corner parts and a surface part provided between two neighboring corner parts of the frame; and
one or a plurality of magnets disposed inside the frame, wherein,
the magnet and the frame are coupled with an adhesive in a rotational shaft direction,
magnetic pole elements of the one or the plurality of magnets are disposed at the plurality of corner parts of the frame,
a reinforcing member is provided at the frame and extends in a circumferential direction along the surface part of the frame,
the reinforcing member extends in the radial direction between the frame and the accommodating part,
the reinforcing member is formed with a member different from a member of the frame,
the accommodating part includes a plurality of corner parts and a surface part provided between two neighboring corner parts of the accommodating part,
a rib is provided at the surface part of the accommodating part, and
the rib extends in a circumferential direction with respect to the motor disposed in the accommodating part.

8. The actuator according to claim 7, wherein
a plurality of reinforcing members are provided at the frame, the plurality of reinforcing members including the reinforcing member,
a plurality of ribs are provided at the housing, the plurality of ribs including the rib,
the reinforcing member and the rib urge the surface part of the frame toward the inside of the motor.

9. The actuator according to claim 7, wherein an end portion of the rib is provided at one of the two neighboring corner parts of the accommodating part.

10. The actuator according to claim 7, wherein the rib is formed with a protruding portion or is formed between a plurality of recessed portions of the housing.

11. The actuator according to claim 7, wherein
a plurality of reinforcing members are provided at the frame, the plurality of reinforcing members including the reinforcing member,
a plurality of ribs are provided at the housing, the plurality of ribs including the rib, the plurality of the reinforcing members and the plurality of the ribs are arranged on an end portion side of the frame with respect to the center of the surface part of the frame.

12. The actuator according to claim 7, wherein the reinforcing member is provided at the corner part and the surface part of the frame.

13. An actuator comprising:
a motor; and
a housing including an accommodating part for the motor, the housing being formed with two members, wherein the motor includes:
a frame including a plurality of corner parts and a surface part provided between two neighboring corner parts of the frame; and
one or a plurality of magnets disposed inside the frame, wherein:
magnetic pole elements of the one or the plurality of magnets are disposed at the plurality of corner parts of the frame,
a reinforcing member is provided at the frame and extends in a circumferential direction along the surface part of the frame,
the reinforcing member extends in the radial direction between the frame and the accommodating part,
the reinforcing member is formed with a member different from a member of the frame,
the accommodating part includes a plurality of corner parts and a surface part provided between two neighboring corner parts of the accommodating part,
a rib is provided at the surface part of the accommodating part, and
the rib extends in a circumferential direction with respect to the motor disposed in the accommodating part.

14. The actuator according to claim 13, wherein
a plurality of reinforcing members are provided at the frame, the plurality of reinforcing members including the reinforcing member,
a plurality of ribs are provided at the housing, the plurality of ribs including the rib, and
the reinforcing member and the rib urge the surface part of the frame toward the inside of the motor.

15. The actuator according to claim 13, wherein an end portion of the rib is provided at one of the two neighboring corner parts of the accommodating part.

16. The actuator according to claim 13, wherein the rib is formed with a protruding portion or is formed between a plurality of recessed portions of the housing.

17. The actuator according to claim 13, wherein
a plurality of reinforcing members are provided at the frame, the plurality of reinforcing members including the reinforcing member,
a plurality of ribs are provided at the housing, the plurality of ribs including the rib, and
the plurality of the reinforcing members and the plurality of the ribs are arranged on an end portion side of the frame with respect to the center of the surface part of the frame.

18. The actuator according to claim 13, wherein the reinforcing member is provided at the corner part and the surface part of the frame.

* * * * *